(12) United States Patent
Nook et al.

(10) Patent No.: US 12,515,542 B2
(45) Date of Patent: Jan. 6, 2026

(54) PORTABLE RECHARGEABLE BATTERY JUMP STARTING DEVICE

(71) Applicant: THE NOCO COMPANY, Glenwillow, OH (US)

(72) Inventors: Jonathan Lewis Nook, Gates Mills, OH (US); William Knight Nook, Shaker Heights, OH (US); James Richard Stanfield, Glendale, AZ (US); Derek Michael Underhill, Tempe, AZ (US)

(73) Assignee: The Noco Company, Glenwillow, OH (US)

(*) Notice: Subject to any disclaimer, the term of this patent is extended or adjusted under 35 U.S.C. 154(b) by 650 days.

(21) Appl. No.: 17/806,845

(22) Filed: Jun. 14, 2022

(65) Prior Publication Data

US 2022/0311267 A1 Sep. 29, 2022

Related U.S. Application Data

(63) Continuation of application No. 16/262,425, filed on Jan. 30, 2019, now Pat. No. 11,394,232, which is a
(Continued)

(51) Int. Cl.
*H02J 7/00* (2006.01)
*B60L 53/14* (2019.01)
(Continued)

(52) U.S. Cl.
CPC .............. *B60L 53/14* (2019.02); *F02N 19/00* (2013.01); *H01M 10/0525* (2013.01);
(Continued)

(58) Field of Classification Search
CPC ...... H02J 7/0042; H02J 7/00712; B60L 53/14
See application file for complete search history.

(56) References Cited

U.S. PATENT DOCUMENTS

| | | |
|---|---|---|
| 2,479,705 A | 8/1949 | True |
| 4,895,530 A | 1/1990 | Gugelmeyer et al. |

(Continued)

FOREIGN PATENT DOCUMENTS

| | | |
|---|---|---|
| AU | 2018323836 | 3/2019 |
| CN | 1435902 | 8/2003 |

(Continued)

OTHER PUBLICATIONS

Japan Patent Office, Appl. 2022-146464, Reason for Refusal, Aug. 8, 2023.
(Continued)

*Primary Examiner* — Robert Grant
(74) *Attorney, Agent, or Firm* — Jones Day

(57) ABSTRACT

A rechargeable battery jump starting device having a highly conductive electrical pathway from a rechargeable battery of the device to a vehicle battery being jump started. The highly conductive pathway can be provided by a highly electrically conductive frame connecting one or more batteries of the rechargeable battery jump starting device to battery clamps of the rechargeable battery jump starting device.

13 Claims, 20 Drawing Sheets

Related U.S. Application Data continuation of application No. PCT/US2018/034902, filed on May 29, 2018.

(60) Provisional application No. 62/561,751, filed on Sep. 22, 2017, provisional application No. 62/552,065, filed on Aug. 30, 2017.

(51) Int. Cl.
| | |
|---|---|
| *F02N 19/00* | (2010.01) |
| *H01M 10/0525* | (2010.01) |
| *H01M 10/44* | (2006.01) |
| *H02J 1/06* | (2006.01) |
| *H02J 1/10* | (2006.01) |
| *H02J 7/34* | (2006.01) |
| *F02N 11/12* | (2006.01) |
| *F02N 11/14* | (2006.01) |

(52) U.S. Cl.
CPC .......... *H01M 10/441* (2013.01); *H02J 1/06* (2013.01); *H02J 1/122* (2020.01); *H02J 7/0042* (2013.01); *H02J 7/342* (2020.01); *F02N 11/12* (2013.01); *F02N 11/14* (2013.01); *H01M 2220/30* (2013.01); *H02J 7/0045* (2013.01); *H02J 7/0063* (2013.01); *H02J 7/00712* (2020.01)

(56) References Cited

U.S. PATENT DOCUMENTS

| | | | |
|---|---|---|---|
| 4,902,955 | A | 2/1990 | Manis et al. |
| 5,077,513 | A | 12/1991 | Dea et al. |
| 5,083,076 | A | 1/1992 | Scott |
| 5,111,130 | A | 5/1992 | Bates |
| 5,277,629 | A | 1/1994 | Rissik et al. |
| 5,367,243 | A | 11/1994 | Wells et al. |
| 5,793,185 | A | 8/1998 | Prelec et al. |
| 5,823,831 | A | 10/1998 | Bowater et al. |
| 6,010,375 | A | 1/2000 | Higuchi |
| 6,130,519 | A | 10/2000 | Whiting et al. |
| 6,215,273 | B1 | 4/2001 | Shy |
| 6,222,342 | B1 | 4/2001 | Eggert et al. |
| 6,623,315 | B1 | 9/2003 | Roderick |
| 8,172,603 | B1 | 5/2012 | Richardet, Jr. |
| 10,432,017 | B1 | 10/2019 | Morales et al. |
| 10,859,054 | B2 | 12/2020 | Nook et al. |
| 11,031,797 | B2 | 6/2021 | Nook et al. |
| 11,394,232 | B2 | 7/2022 | Nook et al. |
| 11,764,591 | B2 | 9/2023 | Nook et al. |
| 2001/0025618 | A1 | 10/2001 | Kelling |
| 2002/0195995 | A1 | 12/2002 | Cook et al. |
| 2003/0141842 | A1 | 7/2003 | Izawa et al. |
| 2003/0170535 | A1 | 9/2003 | Watanabe |
| 2005/0040788 | A1 | 2/2005 | Tseng |
| 2008/0150473 | A1 | 6/2008 | Wise |
| 2008/0185996 | A1 | 8/2008 | Krieger et al. |
| 2009/0230783 | A1 | 9/2009 | Weed et al. |
| 2010/0301800 | A1 | 12/2010 | Inskeep |
| 2012/0091944 | A1 | 4/2012 | Rogers |
| 2013/0119525 | A1 | 5/2013 | Tsuyuno et al. |
| 2013/0280577 | A1 | 10/2013 | Shin |
| 2014/0098525 | A1 | 4/2014 | Bennett |
| 2014/0139175 | A1* | 5/2014 | Gonzalez ............ F02N 11/12 320/105 |
| 2015/0037662 | A1 | 2/2015 | Pinon et al. |
| 2015/0054460 | A1 | 2/2015 | Epstein et al. |
| 2015/0084594 | A1 | 3/2015 | Sun et al. |
| 2015/0091392 | A1 | 4/2015 | Hwang |
| 2015/0349553 | A1 | 12/2015 | Chapple |
| 2015/0377808 | A1 | 12/2015 | Hironaka |
| 2016/0001666 | A1 | 1/2016 | Nook et al. |
| 2016/0049819 | A1 | 2/2016 | Butler et al. |
| 2016/0118644 | A1 | 4/2016 | Kuriki |
| 2016/0172652 | A1 | 6/2016 | Ichikawa et al. |
| 2016/0181587 | A1 | 6/2016 | Koebler et al. |
| 2016/0240834 | A1 | 8/2016 | Manka |
| 2016/0329731 | A1 | 11/2016 | Kokot, Jr. et al. |
| 2017/0012448 | A1 | 1/2017 | Miller et al. |
| 2017/0110766 | A1 | 4/2017 | Koebler |
| 2019/0081472 | A1 | 3/2019 | Guo et al. |

FOREIGN PATENT DOCUMENTS

| | | | |
|---|---|---|---|
| CN | 203734362 | U | 7/2014 |
| CN | 206004392 | U | 3/2017 |
| DE | 9211998 | | 11/1992 |
| JP | S59-122326 | | 7/1984 |
| JP | S63308308 | | 12/1988 |
| JP | H 048848 | U | 3/1989 |
| JP | A 1990101933 | | 4/1991 |
| JP | H 08-285897 | | 11/1996 |
| JP | H 10-312839 | | 11/1998 |
| JP | H 11-041751 | | 2/1999 |
| JP | 2003-217556 | | 7/2003 |
| JP | 2003-229106 | A | 8/2003 |
| JP | 2004-0274839 | | 9/2004 |
| JP | 2005-183146 | | 7/2005 |
| JP | 2009-252607 | | 10/2009 |
| JP | 2011-023249 | | 2/2011 |
| JP | 2011-054338 | | 3/2011 |
| JP | 2012-081140 | | 4/2012 |
| JP | 3182855 | U | 4/2013 |
| JP | 2014-168325 | | 9/2014 |
| JP | 2014-175128 | | 9/2014 |
| JP | A 2014197514 | | 10/2014 |
| JP | 2015-115979 | | 6/2015 |
| JP | 2016-189323 | | 11/2016 |
| JP | 2017-521987 | | 8/2017 |
| JP | 2018-536789 | | 12/2018 |
| WO | 2017/139524 | A1 | 8/2017 |
| WO | WO 2017/139524 | | 8/2017 |
| WO | WO 2019/045879 | | 3/2019 |

OTHER PUBLICATIONS

IP Australia, Appl. 2023248124, Examination Report No. 1, Dec. 10, 2024.
Canadian Intellectual Property Office, Application 3,188,845, Examiner's Report, Aug. 22, 2024.
IP Australia, Appl. 2023285796, Examination Report No. 1, Aug. 23, 2024.
Canadian Intellectual Property Office, Application 3,074,197, Examiner's Report, May 13, 2021.
CNIPA, Appl. 201880067694.7, First Office Action, Dec. 30, 2022.
European Patent Office, Appl. 18851783.3, Communication pursuant to Article 94(3) EPC, May 20, 2020.
European Patent Office, Appl. 18851783.3, Communication pursuant to Article 94(3) EPC, Oct. 11, 2021.
European Patent Office, Appl. 18851783.3, Communication pursuant to Article 94(3), Mar. 16, 2023.
European Patent Office, Appl. 18851783.3, European Search Report, Apr. 8, 2020.
European Patent Office, Application 18851783.3, Communication pursuant to Article 94(3) EPC, Aug. 2, 2021.
International Searching Authority, PCT Search Report and Written Opinion of ISA, Application PCT/US2018/040919, Sep. 21, 2018.
IP Australia, Appl. 2018323836, Examination report No. 1, Aug. 31, 2020.
IP Australia, Appl. 2018323836, Notice of Acceptance, Sep. 2, 2021.
IP Australia, Appl. 2021286367, Examination Report No. 1, Nov. 22, 2022.
IP Australia, Appl. 2023206145, Examination Report No. 1, Jul. 10, 2024.
Japan Patent Office, Appl. 2020-511887, Notification of Reasons for Refusal, Mar. 15, 2022.
Japan Patent Office, Appl. 2020-511887, Notification of Reasons for Refusal, May 11, 2021.

(56) References Cited

OTHER PUBLICATIONS

UK IP Office, Appl. 2002890.8 Examination Report under Section 18(3), Jan. 28, 2022.
IP Australia, Appl. 2022201289, Examination Report No. 1, Jun. 7, 2023.
European Patent Office, Appl. 18851477.2, Communication Pursuant to Article 94(3), Apr. 2, 2025.
Canadian Intellectual Property Office, Application 3,188,845, Examiner's Report, Jul. 22, 2025.
IP Australia, Appl. 2023248124, Examination Report No. 2, Oct. 30, 2025.
IP Australia, Appl. 2024266725, Examination Report No. 1, Nov. 12, 2025.

\* cited by examiner

PORTABLE RECHARGEABLE BATTERY JUMP STARTING DEVICE

FIELD

The present invention is directed to a portable rechargeable battery jump starting device configured for providing maximum conductivity and power delivery to a vehicle battery being jump started. The rechargeable battery jump starting device according to the present invention, for example, is useful for jump starting cars, trucks, heavy equipment, commercial vehicles, or equipment such as trucks, buses, commercial trucks, front loaders, dozers, back hoes, excavators, rollers, fork lift, specialized commercial equipment, logging equipment, airplanes, jets, and boats.

BACKGROUND

There exists U.S. Pat. No. 9,007,015 to Nook et al. entitled Portable Vehicle Battery Jump Start Apparatus with Safety Protection. This battery jump start apparatus utilizes a lithium ion battery pack. In this type of apparatus, there exists a need to maximize conductivity from the battery pack of the apparatus to the vehicle battery of the vehicle being jump started. For successful vehicle jump-starts, there are two main factors dictating the results. The first factor is the amount of power provided by the lithium ion battery pack, and the second factor is the maximum conductivity. You need both factors to have the best chance to jump-start big engines. One factor without the other factor is not enough.

Further, there exists PCT application no. PCT/US2016/024680 filed on 29 Mar. 2016 (published 17 Aug. 2017 as WO 2017/138963 A1) entitled Battery Assembly Device. The battery assembly device disclosed provides an enhanced electrically conductive battery assembly for use, for example, in a battery jump start apparatus.

In addition, there exists PCT application no. PCT/US2017/017289 filed on 10 Feb. 2017 (published 17 Aug. 2017 as publication no. WO 2017/139524 A1) entitled Battery Connector Device for a Battery Jump Starting Device. The battery assembly device disclosed provides an enhanced electrically conductive battery assembly for use, for example, in a battery jump start apparatus.

Also, currently there exist heavy duty battery jump starters using conventional lead acid batteries. The jump starters are heavy in weight (e.g. hundreds of pounds) and large dimensionally requiring the jump starter to be moved around using a fork lift. Thus, the current battery jump starters are not portable in any manner.

There exists a need for a portable improved battery jump starting device having significantly increased power output (i.e. high power output), reduced weight, and reduced size to replace conventional units.

SUMMARY

The presently described subject matter is directed to an improved battery jump starting device.

The presently described subject matter is directed to an improved high output battery jump starting device.

The presently described subject matter is directed to an improved battery jump starting device configured to deliver a significantly higher power output from the one or more batteries of the jump starting device to a vehicle battery being jump started.

The presently described subject matter is directed to an improved battery jump starting device configured to deliver a significantly higher power output from the one or more batteries of the jump starting device via a highly electrically conductive frame to a vehicle battery being jump started.

The presently described subject matter is directed to an improved battery jump starting device configured to deliver a significantly higher power output from the one or more batteries of the jump starting device via a highly electrically conductive frame, cables, and clamps to a vehicle battery being jump started.

The present described subject matter is directed to a highly conductive battery jump starting device configured to delivery higher power from a rechargeable battery of the jump starting device to a vehicle battery being jump started.

The presently described subject matter is directed to a high power output heavy duty jump starting device.

The presently described subject matter is directed to a battery jump starting device comprising one or more rechargeable batteries connected to a highly electrically conductive electrical frame.

The presently described subject matter is directed to a battery jump starting device comprising one or more batteries connected to a rigid highly electrically conductive frame.

The presently described subject matter is directed to a battery jump starting device comprising one or more Lithium-ion batteries ("Li-ion") connected to a highly electrically conductive frame.

The presently described subject matter is directed to a battery jump starting device comprising one or more Lithium-ion batteries ("Li-ion") connected to a highly electrically conductive frame.

The presently described subject matter is directed to a battery jump starting device comprising one or more Lithium-ion batteries ("Li-ion") connected to a highly conductive and high ampere ("amp") current capacity frame.

The presently described subject matter is directed to a battery jump starting device comprising multiple batteries connected to a highly electrically conductive frame.

The presently described subject matter is directed to a battery jump starting device comprising two or more Li-ion batteries connected to a highly electrically conductive frame.

The presently described subject matter is directed to a battery jump starting device comprising multiple Li-ion batteries connected to a highly electrically conductive frame.

The presently described subject matter is directed to a battery jump starting device comprising one or more Li-ion batteries connected to a highly electrically conductive frame providing higher power conductivity.

The presently described subject matter is directed to a battery jump starting device comprising a rechargeable battery connected to a highly electrically conductive frame configured to at least partially surround the rechargeable battery.

The presently described subject matter is directed to a battery jump starting device comprising a rechargeable battery connected to a highly electrically conductive frame configured to surround the rechargeable battery in at least one plane of the battery The presently described subject matter is directed to a battery jump starting device comprising a rechargeable battery connected to a highly electrically conductive frame configured to surround the rechargeable battery in multiple orthogonal planes of the battery.

The presently described subject matter is directed to a battery jump starting device comprising a rechargeable battery connected to a highly electrically conductive frame configured to fully surround the rechargeable.

The presently described subject matter is directed to a battery jump starting device comprising one or more batteries connected to a highly electrically conductive frame configured to fully surround the one or more batteries.

The presently described subject matter is directed to a battery jump starting device comprising one or more Li-ion batteries connected to a highly electrically conductive frame configured to at least partially surround the one or more batteries.

The presently described subject matter is directed to a battery jump starting device comprising one or more Li-ion batteries connected to a highly electrically conductive frame configured to at least partially surround the one or more batteries.

The presently described subject matter is directed to a battery jump starting device comprising one or more Li-ion batteries connected to a highly electrically conductive frame configured to fully surround the one or more batteries.

The presently described subject matter is directed to a battery jump starting device comprising one or more Li-ion batteries connected to a highly electrically conductive frame configured to fully surround the one or more batteries.

The presently described subject matter is directed to a battery jump starting device comprising one or more batteries connected to a rigid highly electrically conductive frame.

The presently described subject matter is directed to a battery jump starting device comprising one or more batteries connected to a rigid highly electrically conductive frame comprising one or more highly electrically conductive conductors or frame members.

The presently described subject matter is directed to a battery jump starting device comprising one or more batteries connected to a highly electrically conductive frame comprising one or more highly electrically conductive conductors or frame members.

The presently described subject matter is directed to a battery jump starting device comprising one or more batteries connected to a highly electrically conductive frame comprising one or more highly conductive conductors or frame members made of metal plate, bar, rod, tubing, and/or cable.

The presently described subject matter is directed to a battery jump starting device comprising one or more batteries connected to a highly electrically conductive frame comprising one or more highly electrically conductive conductors or frame members such as Copper (Cu) plate, bar, rod, tubing, and/or cable.

The presently described subject matter is directed to a battery jump starting device comprising one or more batteries connected to a highly electrically conductive rigid frame comprising one or more rigid highly electrically conductive conductors or frame members such as Aluminum (Al) plate, bar, rod, tubing and/or cable.

The battery jump starting device according to the present invention is configured to maximize the amount of power transmission and power delivered from the one or more rechargeable batteries (e.g. Li-ion) to a battery being jump started. This requires a power circuit having a high or very high electrically conductivity pathway from the one or more rechargeable batteries to the battery clamps. This physically requires the use of high or very high electrically conductivity conductors such as copper or aluminum plates, bars, rod, tubing, and/or cables.

The "rigidity" and "strength" of the highly electrically conductive frame (e.g. rigid frame) provides structurally stability during storage and use of the battery jump starting device. This is important especially during use when high current is flowing through the highly electrically conductive frame potentially heating and softening the rigid frame. It is highly desired that the highly electrically conductive frame maintains structurally stability and configuration during use so as to avoid the risk of contact and electrically shorting with other electrical components of the rechargeable battery jump starting device. This is especially true when making a compact and portable configuration of the battery jump starting device to allow minimizing size and distances between electrical components.

DETAILED DESCRIPTION

Figure 1:
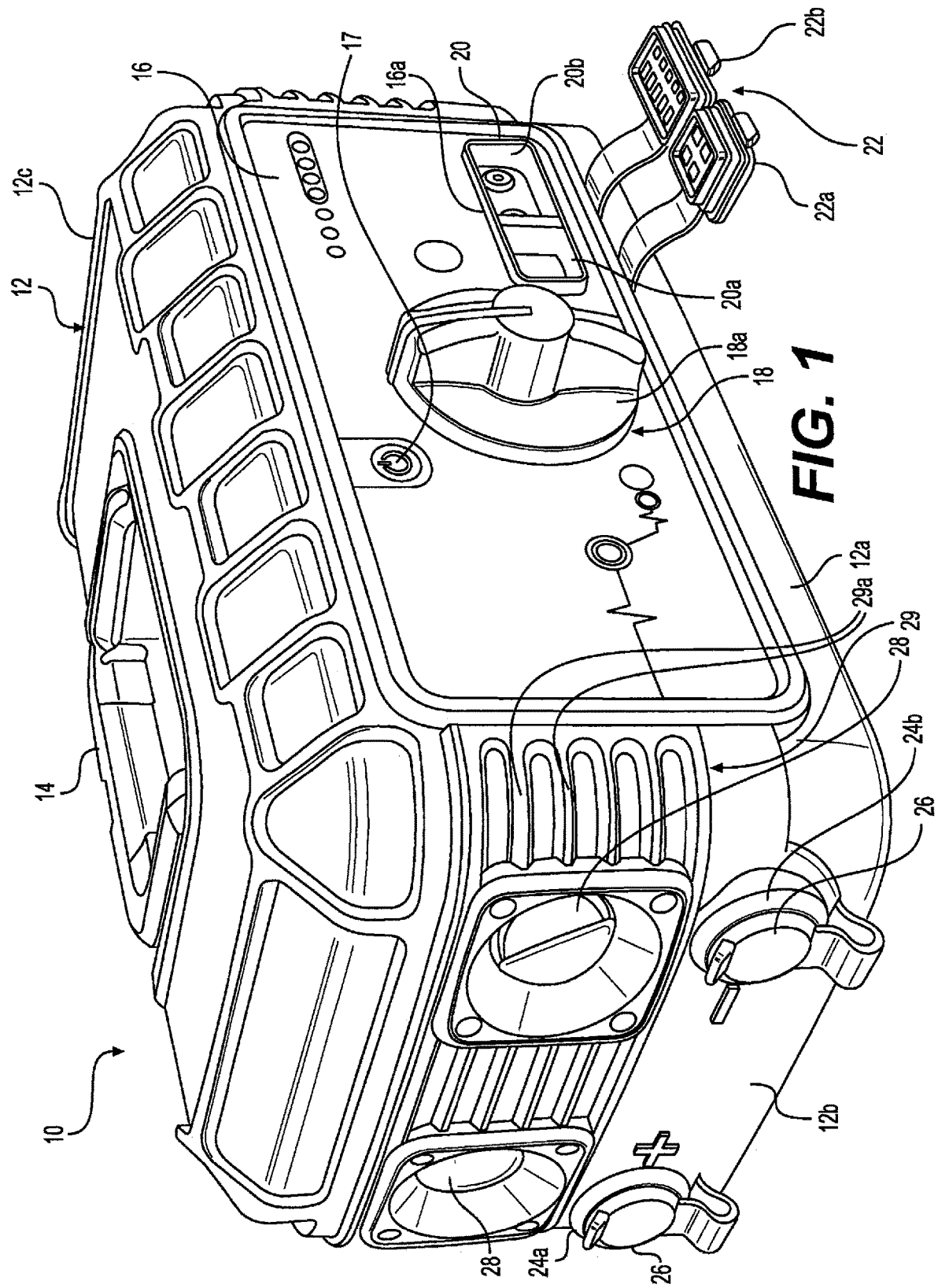
FIG. 1 is a front perspective view of a battery jump starting device according to the present invention.

The battery jump starting device 10 according to the present invention is shown in FIGS. 1-8.

The battery jump starting device 10 comprises a cover 12 fitted with a handle 14, as shown in FIGS. 1-8, and having a particular design as shown.

The battery jump starting device 10 comprises a front interface 16 having a power button 17 for turning the power on or off, and an electrical control switch 18 having a control knob 18a for operating the internally located control switch 18. The control switch 18 is configured so that the control knob 18a can be selectively rotated between a first position (12V mode) to a second position (24V mode) depending on the particular voltage system of the vehicle being jump started (e.g. 12V, 24V).

The interface 16 can be provided with the following features as shown in FIG. 1, including:
1) Power Button 17;
2) Power LED (e.g. White colored LED);
3) 12V Mode LED (e.g. White colored LED);
4) 24V Mode LED (e.g. Blue colored LED);
5) Error LED (e.g. Red colored LED);
6) Cold Error LED (e.g. Blue colored LED);
7) Hot Error LED (e.g. Red colored LED);
8) Internal Battery Fuel Gauge LEDs (e.g. Red, Red, Amber, Green LEDs);
9) Flashlight Mode Button;
10) Flashlight LED (e.g. White colored LED);
11) 12V IN LED (e.g. White/Red LED);
12) 12V OUT LED (e.g. White/Red LED);
13) USB OUT LED (e.g. White LED);
14) Manual Override Button:
15) Manual Override LED Red:
16) Voltmeter Display LED (e.g. White colored LED);
17) 12V Mode LED (e.g. White colored LED);
18) 24V Mode LED (e.g. Blue colored LED); and
19) Boost LED (e.g. White colored LED).

The above features can be modified with different colors, and/or arrangements on the face of the interface 16.

Figure 2:
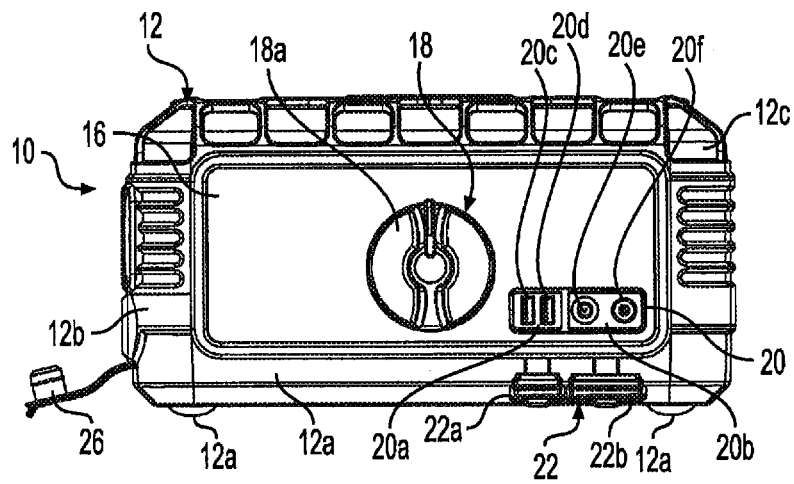
FIG. 2 is a front elevational view of a battery jump starting device shown in FIG. 1.
Figure 3:
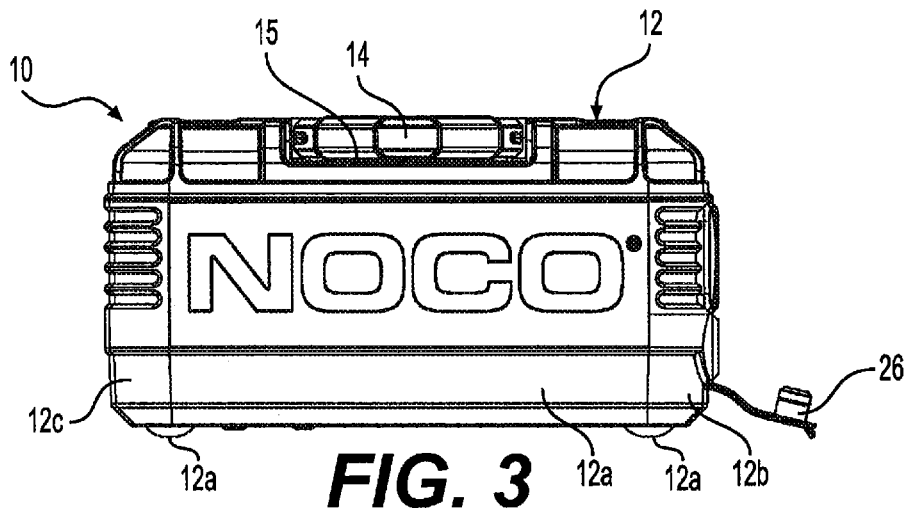
FIG. 3 is a rear elevational view of the battery jump starting device shown in FIG. 1.

The battery jump starting device 10 further comprises a port 20 having left-side port 20a and right-side port 20b, as shown in FIG. 2. The port 20 is configured to extend through a through hole 16a located in the lower right side of the interface 16. The left-side port 20a, for example, accommodates dual 2.1 amp (A) USB OUT ports 20c, 20d and the right-side port 20b accommodates an 18 A 12V XGC OUT port 20e and a 5 A 12V XGC IN port 20e, as shown in FIG. 2. The cover 12 is provided with the resilient sealing cap 22, including left sealing cap 22a for sealing left port 20a and right sealing cap 22b for sealing right port 20b during non-use of the ports 20a, 20b.

Figure 4:
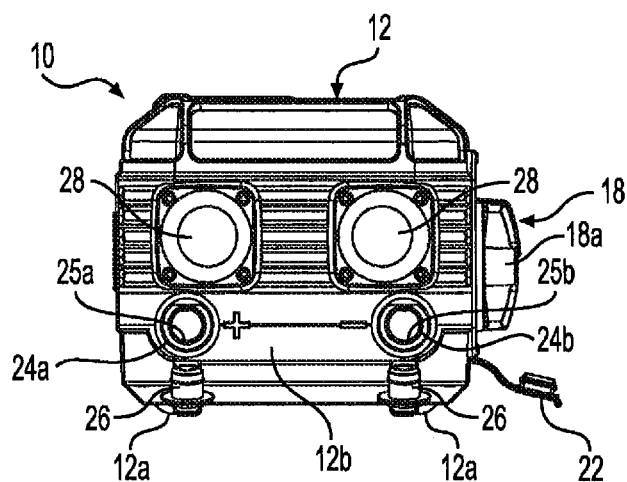
FIG. 4 is a left side elevational view of the battery jump starting device shown in FIG. 1.
Figure 5:
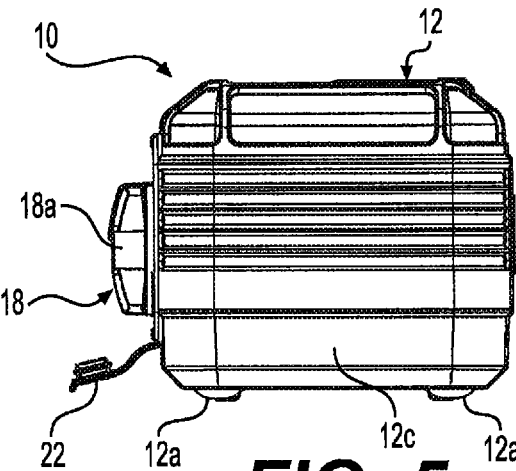
FIG. 5 is a right side elevational view of the battery jump staring device shown in FIG. 1.
Figure 6:
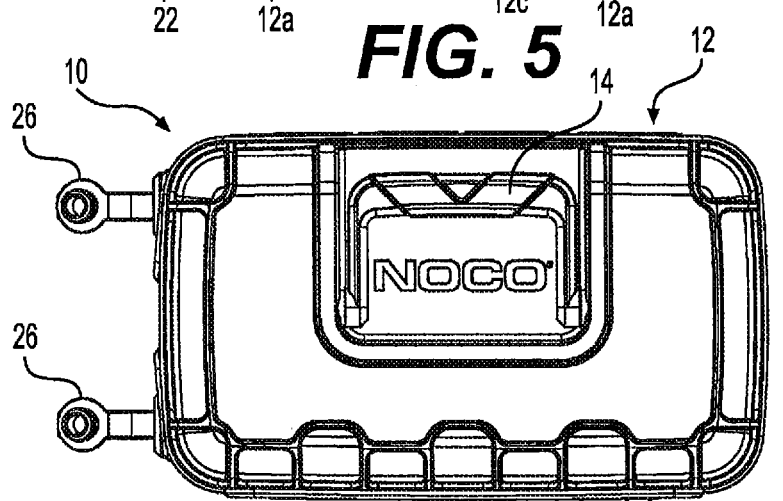
FIG. 6 is a top planar view of the battery jump starting device shown in FIG. 1.
Figure 7:
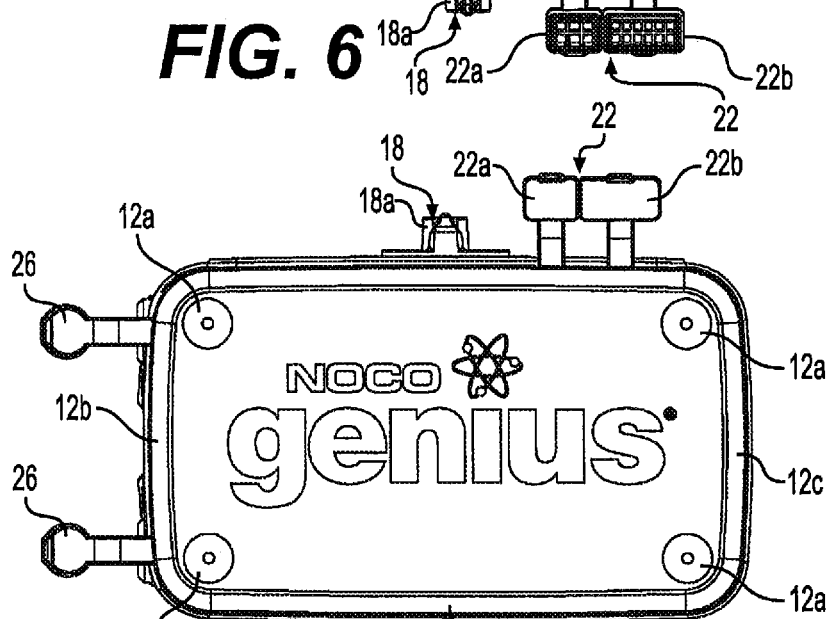
FIG. 7 is a bottom planar view of the battery jump starting device shown in FIG. 1.
Figure 8:
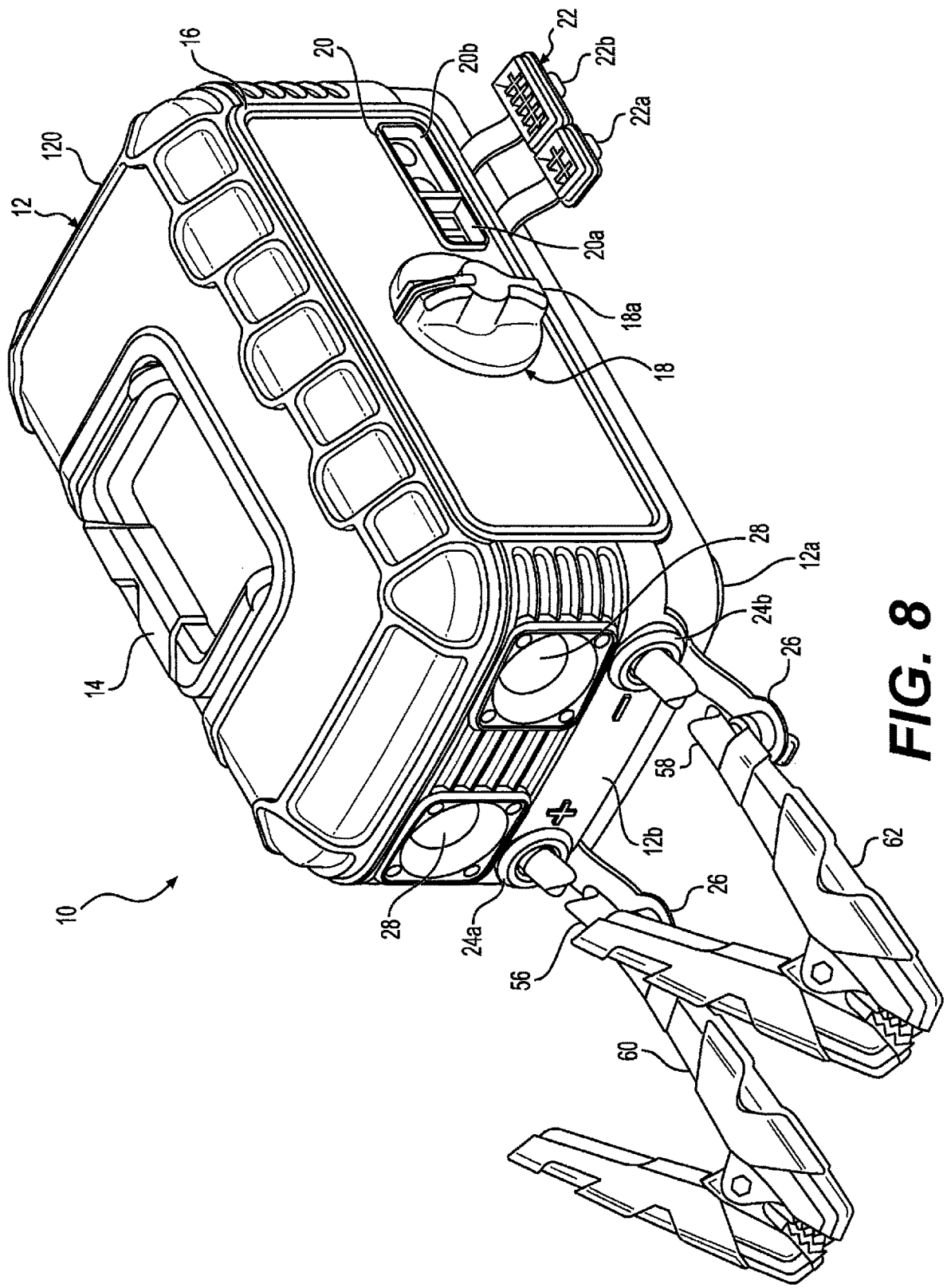
FIG. 8 is a perspective view of the battery jump starting device shown in FIG. 1 with detachable battery cables attached to the battery jump starting device.

The left side of the battery jump starting device 10 is also fitted with a pair of light emitting diodes 28 (LEDS) for using the battery jump starting device 10 as a work light. For example, the LEDs 28 are dual 1100 Lumen high-intensity LED floodlights), as shown in FIGS. 1, 4, and 8. The LEDs 28 are configured to have seven (7) operational modes, including 100% intensity, 50% intensity, 10% intensity, SOS (emergency protocol), Blink, Strobe, and Off.

The battery jump starting device 10 is fitted with a heat sink 29 (FIG. 1) for dissipating heat from the LEDs 28. For example, the heat sink 29 is made of a heat conductive material (e.g. machined, molded, and/or die cast aluminum heat sink). The rib design shown (FIG. 1) facilitates the heat sink 29 transferring heat from the heat sink 29 to the surrounding atmosphere to prevent the LEDs 28 from overheating.

The battery jump starting device 10 is shown in FIG. 1 without battery cables. The battery jump starting device 10 is shown in FIG. 8 having cables 56, 58 respectively connected to battery clamps 60, 62 for connecting the battery jump starting device 10 to a battery to be jump started (e.g. vehicle battery). The battery jump starting device 10 can be configured to detachably connect to the set of battery cables 56, 58 respectively having the battery clamps 60, 62 (e.g. positive battery cable with a positive clamp, negative battery cable with a negative clamp). Alternatively, the battery jump starting device can be fitted with battery cables hard wired directly to the device and being non-detachable.

Figure 11:
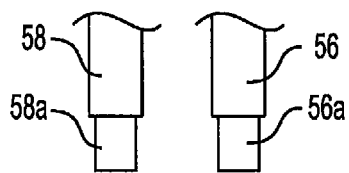
FIG. 11 is a top view of the connection ends of the detachable battery cables shown in FIG. 9.

In the first embodiment shown in FIGS. 1 and 4, the left side of the battery jump starting device 10 is provided with POSITIVE (+) cam-lock 24a and NEGATIVE (−) cam-lock 24b. The cam-locks 24a, 24b include receptacles 25a, 25b (FIG. 4) configured for detachably connecting with connecting end 56a (FIG. 11) of the positive battery cable 56 and the connecting end 58a of negative battery cable 58, respectively. The cam-locks 24a, 24b are fitted with sealing caps 26 (FIG. 1) for closing and sealing the receptacles 25a, 25b of the cam-locks 24a, 24b, respectively, during non-use of the battery jump starting device 10.

Figure 9:
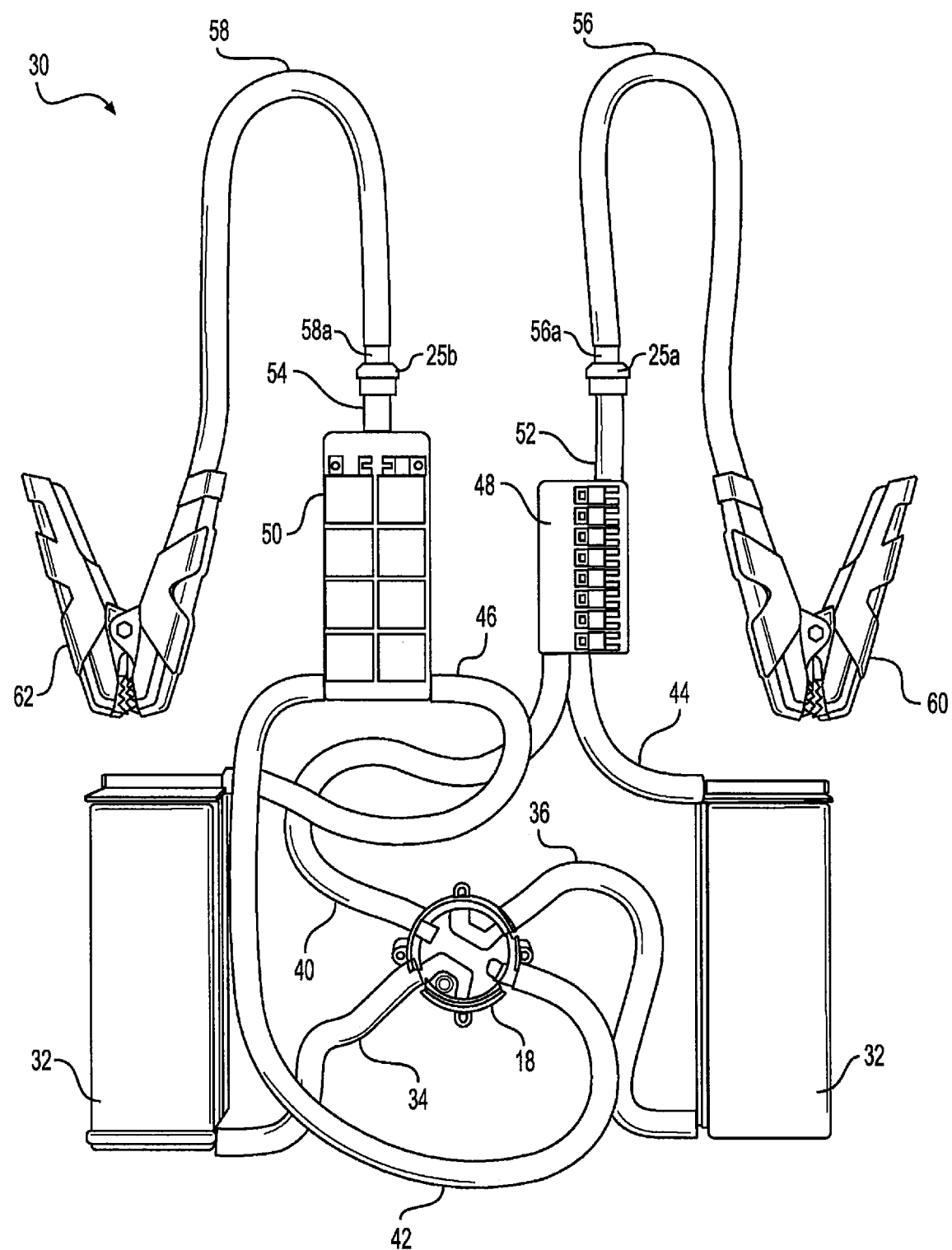
FIG. 9 is a top view of the layout of interior components of the battery jump starting device shown in FIG. 1 having detachable battery cables.

The power circuit 30 of the battery jump starting device 10 is shown in FIG. 9.

The power circuit 30 comprises two (2) separate Lithium ion (Li-ion) batteries 32 (e.g. two (2) 12V Li-ion batteries) connected to the control switch 18 via a pair of cable sections 34, 36 (e.g. insulated copper cable sections), respectively. The control switch 18 is connected to the reverse currently diode array 48 (i.e. reverse flow protection device) via the cable section 44, and the control switch 18 is connected to the smart switch 50 (e.g. 500 A solenoid device) via cable section 40, as shown in FIG. 9.

The reverse current diode array 48 is connected to the one battery 32 via cable section 44, and the smart switch 50 is connected to the other battery 32 via cable section 46, as shown in FIG. 9.

The positive battery cable 56 having a positive battery clamp 60 is detachably connected to the positive cam-lock 25a (FIG. 9), which is connected to the reverse current diode array 48 via cable section 52.

The negative battery cable 58 having a negative battery clamp 62 is detachably connected to the negative cam-lock 25b (FIG. 9), which is connected to the smart switch 50 via cable section 54.

In the above described first embodiment of the power circuit 30, the electrical components of the power circuit 30 are connected together via cable sections (e.g. heavy gauge flexible insulated copper cable sections). The ends of cable sections are soldered and/or mechanically fastened to the respective electrical components to provide highly electrically conductive electrical connections between the electrical components.

Figure 10:
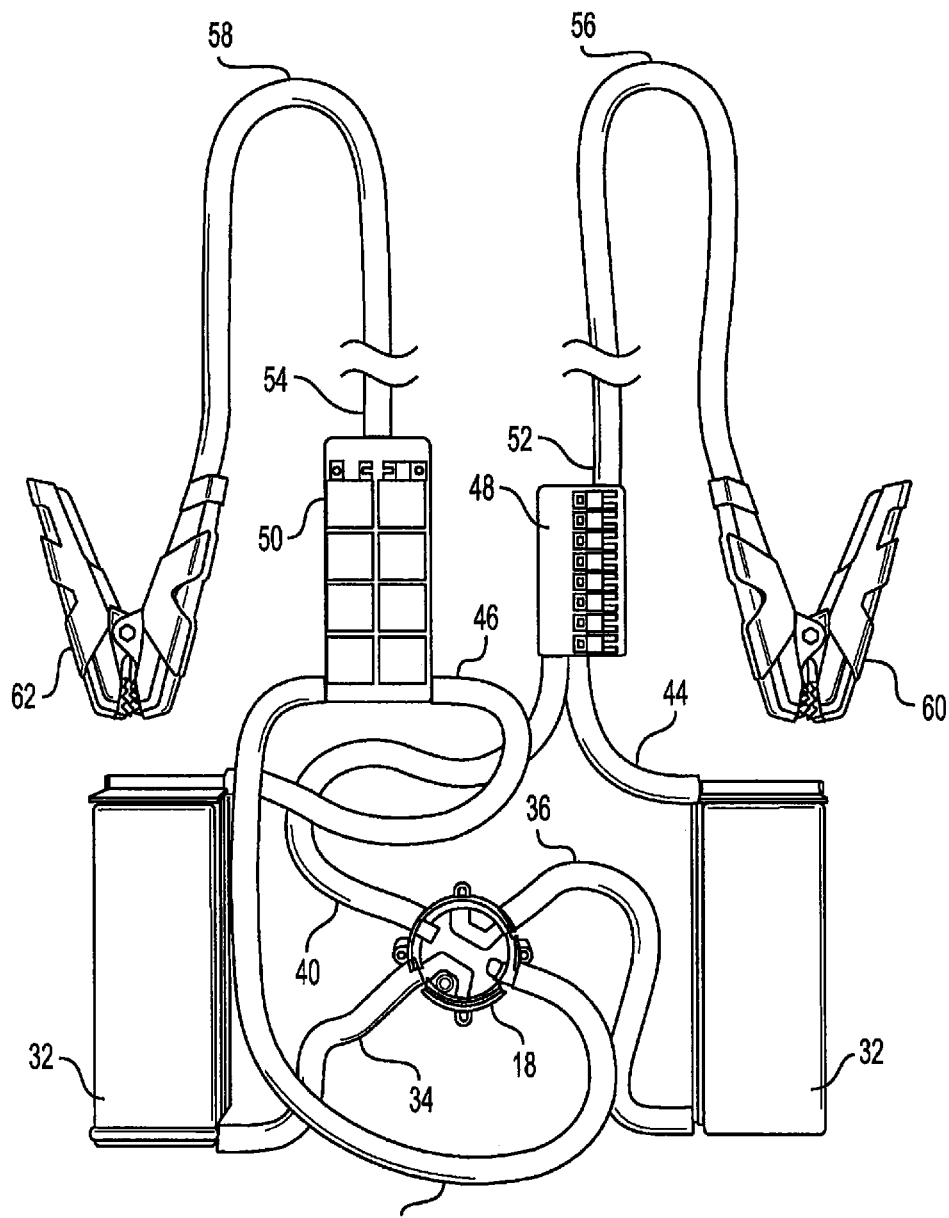
FIG. 10 is a top view of the layout of interior components of the battery jump starting device shown in FIG. 1 having non-detachable battery cables.

In a modified first embodiment shown in FIG. 10, the battery cables 56, 58 are directly hard wired to the reverse current diode array 48 and smart switch 50, respectively, eliminating the cam-locks 25a, 25b, so that the battery cables 56, 58 are no longer detachable.

In a second embodiment of the power circuit to be described below, the cable sections 36, 40, 42, 44 located between the Li-ion batteries 32 and the reverse current diode array 48 and smart switch 50, respectively, are replaced with a highly electrically conductive frame (e.g. rigid frame).

The control switch 18 assembly is shown in FIGS. 12-15. The control switch 18 comprises the following:
1) control knob 18a;
2) front housing 72;
3) rear housing 74;
4) rotor 76 having a collar 76a, legs 76b, and legs 76c;
5) springs 78;
6) pivoting contact 80 each having two (2) points of contact (e.g. slots 80c);
7) separate terminals 82, 84, 86, 88;
8) connected terminals 90, 92;
9) conductive bar 94
10) O-ring 96;
11) O-ring 98; and
12) O-ring 100.

The control knob 18a comprises rear extension portions 18b, 18c. The extension portion 18c has a T-shaped cross section to connect into a T-shaped recess 76e (FIG. 12) in rotor 76 when assembled. The rotor 76 is provided with a flange 76a configured to accommodate the rear extension portion 18b (e.g. round cross-section) therein.

The pair of legs 76c (e.g. U-shaped legs) of the rotor 76 partially accommodate the springs 78, respectively, and the springs 78 apply force against the pivoting contacts 80 to maintain same is highly conductive contact with the selected contacts 82b-92c of the terminals 82-92.

The pivoting contacts 80 each have a pivoting contact plate 80a having a centered slot 80b configured to accommodate an end of each leg 76b of the rotor 76. When the rotor 76 is turned, each leg 76b actuates and pivots each pivoting contact plate 80a.

Further, the pivoting contact plates 80a each having a pair of spaced apart through holes 80c (e.g. oval-shaped through holes) serving as two (s) points of contact with selected contacts 82c-92c of the terminals 82-92.

The terminals 82-92 have threaded posts 82a-92a, spacer plates 82b-92b, and conductive bar 94, respectively, configured so that the contacts 82c-92c are all located in the same plane (i.e. plane transverse to longitudinal axis of the control switch 18) to allow selective pivoting movement of the pivoting contacts 80. The threaded posts 82a-92a of the terminals 82-92 are inserted through the through holes 74a, respectively, of the rear housing 74.

Figure 12:
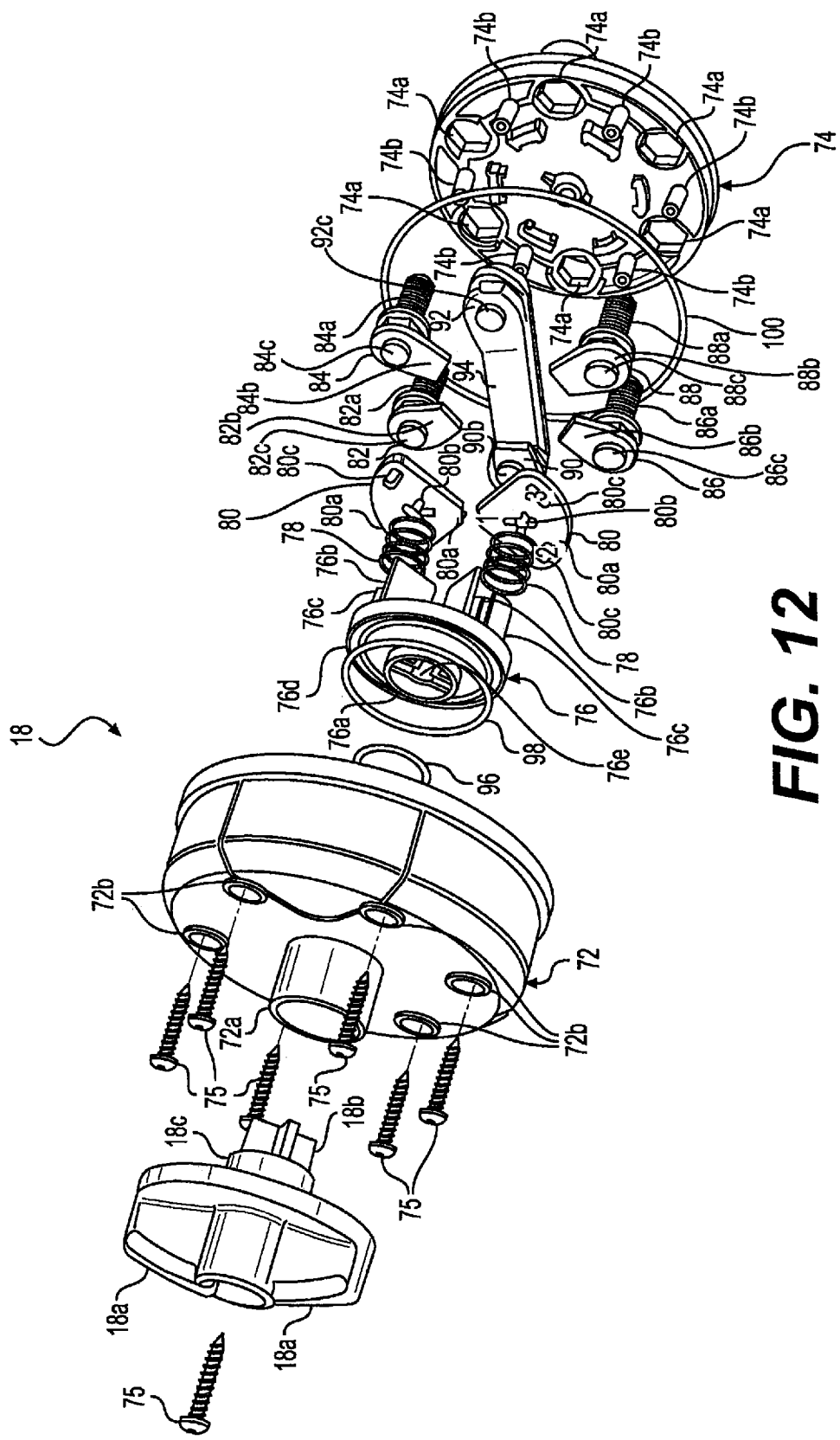
FIG. 12 is an exploded perspective view of the control switch installed on the front of the battery jump starting device shown in FIG. 1.

The O-rings 96, 98, 100, as shown in FIG. 12, seal the separate the various components of the control switch 18 as shown. After assembly of the control switch 18, a set of screws 75 connect with anchors 74b of the rear housing 74 to secure the front housing 72 to the rear housing 74 as shown in FIG. 12.

Figure 13:
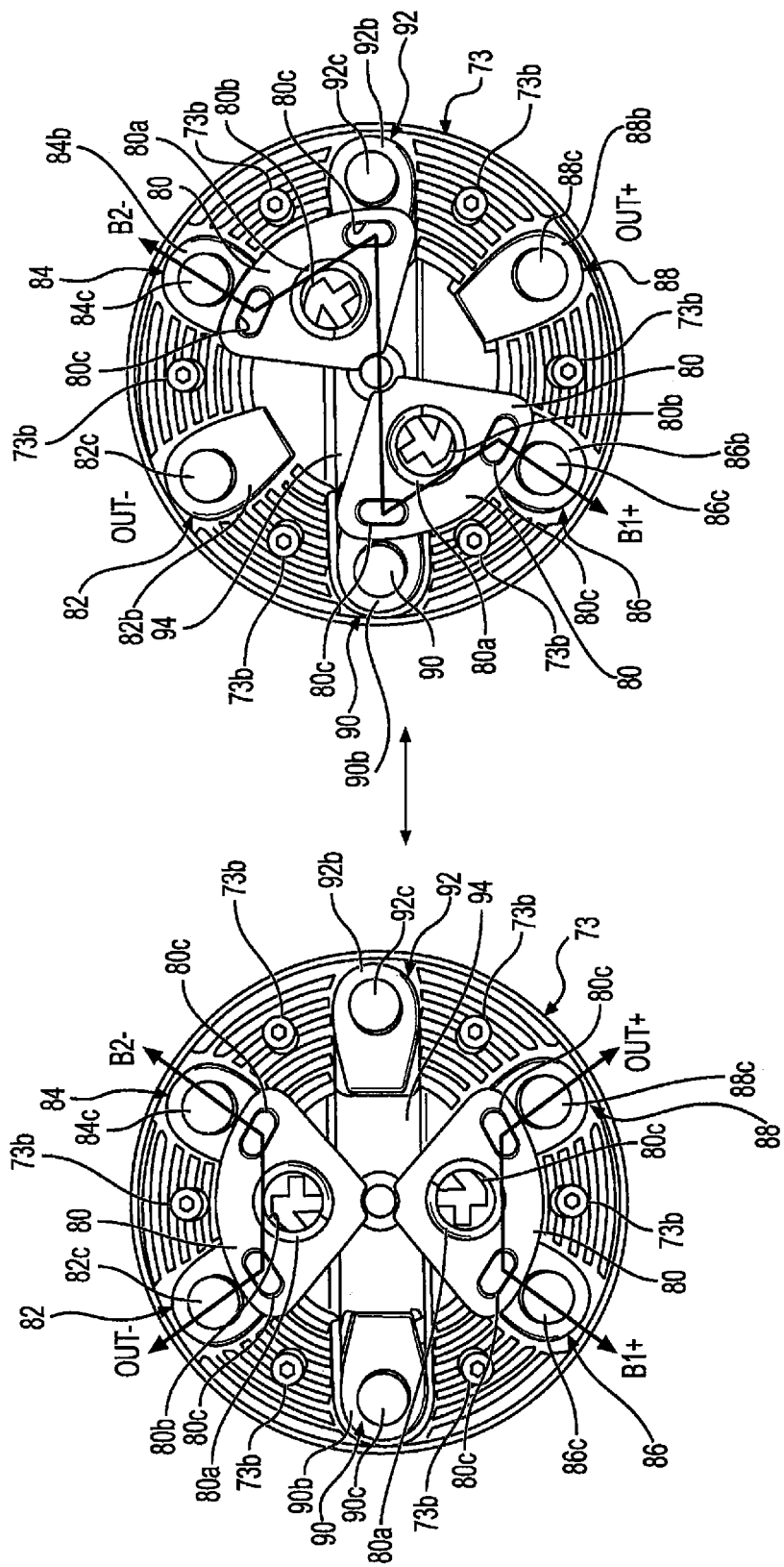
FIG. 13 is a front elevational view of the switch plate of the control switch shown in FIG. 12 operable between a first position and second position.

The control switch 18 is a 12V/24V selective type switch as shown in FIG. 13. The configuration of the pivoting contacts 80 in the first position or Position 1 (i.e. Parallel position) is shown on the left side of FIG. 13, and the second position or Position 2 (i.e. Series position) is shown on the right side of FIG. 13.

Figure 15:
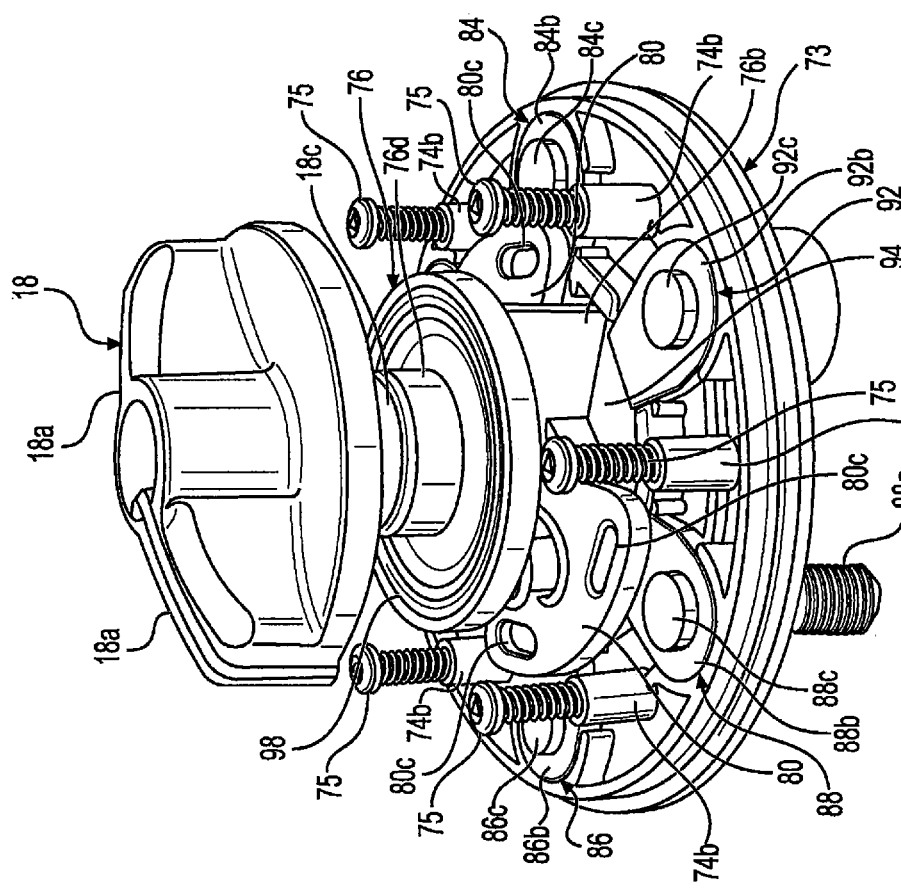
FIG. 15 is a perspective view of the control switch shown in FIG. 12.
Figure 14:
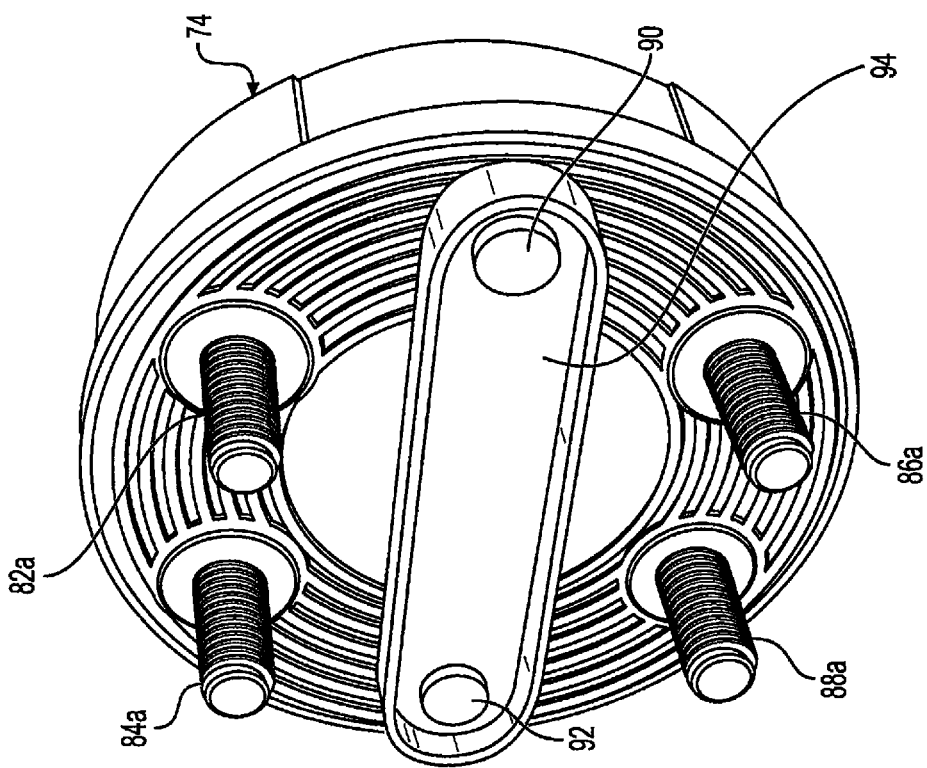
FIG. 14 is a rear perspective view of the switch plate shown in FIG. 13.

The rear side of the control switch 18 is shown in FIG. 14. Another highly electrically conductive bar 94 is provided on the rear outer surface of the rear housing 74. The fully assembled control switch 18 is shown in FIG. 15.

The second embodiment of the battery jump starting device 110 is shown in FIGS. 20-25 with the cover 112 removed. The cover for the battery jump starting device 110 is the same as the cover 12 of the battery jump starting device 10 shown in FIG. 1-8.

In the second embodiment of the battery jump starting device 110 compared to the battery jump starting device 10 shown in FIGS. 1-8, the cable sections 34, 36, 40, 42, 44, 46 (FIG. 9) in the first embodiment are replaced with a highly electrically conductive frame 170.

The battery jump starting device 110 comprises a pair of 12V Li-ion batteries 132 directly connected to the highly electrically conductive rigid frame 170. Specifically, the tabs (not shown) of the Li-ion batteries are soldered to the highly conductive rigid frame 170.

The highly electrically conductive rigid frame 170 is constructed of multiple highly electrically conductive conductors or frame members 134, 136, 140, 142, 144, 146, 152, 154 connected together, for example, by mechanical fasteners (e.g. copper or aluminum nut and bolt fasteners) and/or soldering. For example, the highly electrically conductive rigid frame members are made of highly electrically conductive copper rods. Alternatively, the highly electrically conductive copper rods can be replaced with highly electrically conductive copper or aluminum plates, bars, tubing, cables, or other suitably configured highly electrically conductive material (e.g. copper stock material of a various cross-sectional shapes, sizes, or gauges). The highly electrically conductive rigid frame 170 comprises highly electrically conductive conductors or frame members 134, 136, 140, 142, 144, 146, which can be insulated (e.g. wrapped, insulated, heat shrink cover) in at least key areas to prevent any internal short circuiting.

The highly electrically conductive rigid frame members can be configured with flattened end portions (e.g. flattened by pressing) each having a through hole to provide part of a mechanical connection for connecting successive or adjacent highly electrically conductive conductors or frame members and/or electrical components together using a highly electrically conductive nut and bolt fastener (e.g. copper or aluminum bolt and nut). In addition, the highly conductive rigid frame member can be formed into a base (e.g. plate or bar portion) for supporting or connecting with an electrical component.

For example, the reverse flow diode assembly 148 has three (3) base portions, including (1) an upper highly electrically conductive rigid bar 148a (FIG. 16) having a flattened end portion 148aa connected to the flattened end portion 144a of highly electrically conductive rigid frame member 144 using a highly electrically conductive fastener 206 (e.g. made of copper or aluminum) having a highly electrically conductive bolt 206a and highly electrically conductive nut 206b; (2) a lower highly electrically conductive rigid bar 148b made from a flattened end portion of highly electrically conductive rigid frame member 144; and (3) a center highly electrically conductive rigid bar 148c made from a flattened end portion of the highly conductive rigid frame member 152.

As another example, the smart switch 150 (FIG. 16) comprises a highly electrically conductive rigid plate 150a serving as a base supporting the solenoid 150b. The highly conductive rigid plate 150a is provided with through holes for connecting the highly electrically conductive rigid frame members to the smart switch 150 (e.g. highly electrically conductive rigid frame member 142) using highly electrically conductive fasteners 206.

The stock material (e.g. copper or aluminum plate, bar, rod, or tubing) selected for construction of the highly electrically conductive rigid frame 170 has substantial gauge to provide high electrically conductivity and substantial rigidity. The "rigid" nature of the highly conductive rigid frame 170 provides the advantage that the highly conductive rigid frame remains structurally stiff and stable during storage and use of the battery jump starting device 110.

For example, the highly conductive rigid frame 170 is designed and constructed to significantly prevent flexing, movement, bending and/or displacement during storage or use so as to prevent electrical shortages of the highly electrically conductive rigid frame touching other internal electrical components or parts of the electronic assembly. This "rigid" nature is important due to the high electrically conductivity path or pathway of electrical power flowing from the Li-ion batteries through the power circuit and reaching the battery clamps 60, 62. It is a desired goal and feature of the present invention to electrically conduct as much power as possible from the Li-ion batteries to the battery being jump started by the battery jump starting device by reducing or minimizing any electrical resistance by using the heavy duty and highly electrically conductive frame 170 arrangement disclosed.

As an alternative, the highly electrically conductive rigid frame 170 can be constructed as a single piece having no mechanically fastened joints (e.g. one piece construction, soldered pieces). For example, the highly electrically conductive frame can be made from a single piece of stock material and then formed into the highly conductive rigid frame. For example, a billet of highly conductive copper can be machined (e.g. milled, lathed, drilled, bent, formed) into the highly electrically conductive rigid frame. As another example, a copper or aluminum sheet or plate can be bent and/or machined into the highly electrically conductive rigid frame 170. As a further alternative, the highly electrically conductive frame 170 can be metal molded (e.g. loss wax process).

As another alternative, the highly electrically conductive rigid frame 170 is made of multiple highly electrically conductive frame members connected together into a unitary structure. For example, the highly electrically conductive rigid frame is made of highly electrically conductive sections of stock material (e.g. copper rod, plate, bar, tubing), which are bent and soldered and/or welded together.

Figure 17:
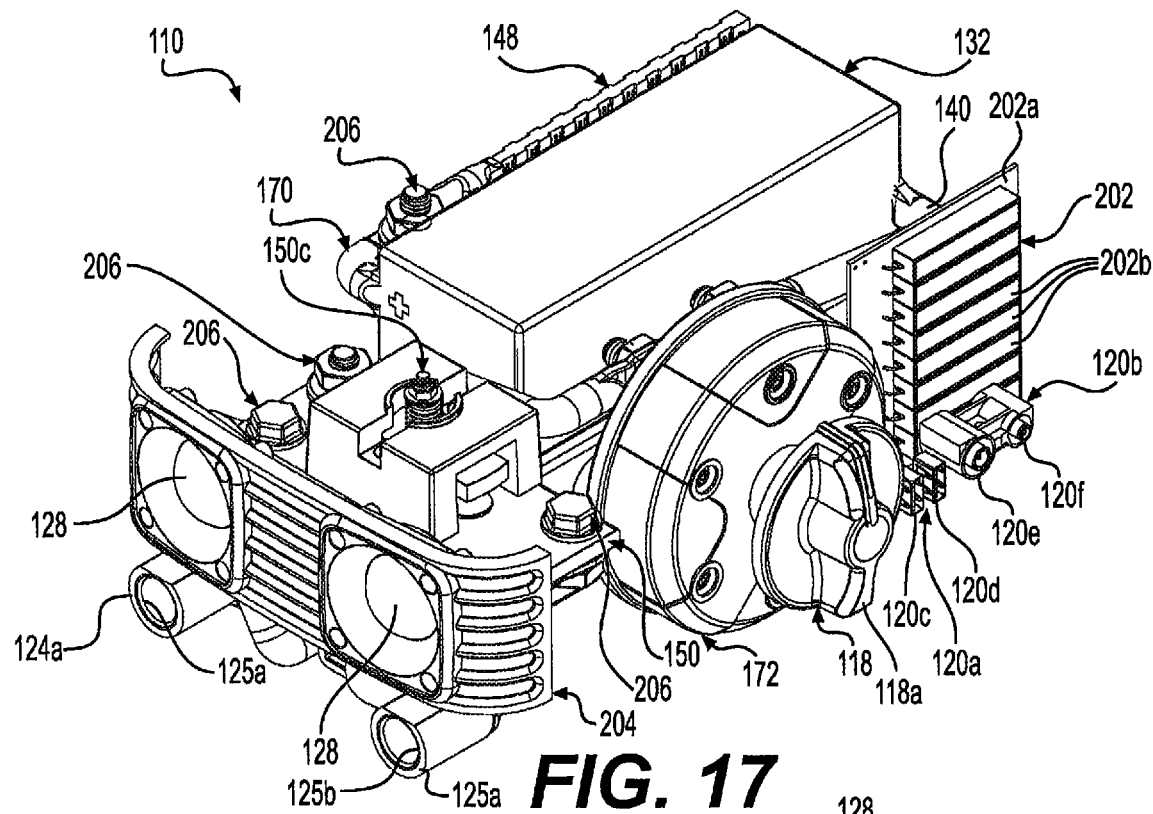
FIG. 17 is a front and left side perspective view of the battery jump starting device shown in FIG. 1 with the cover removed.
Figure 18:
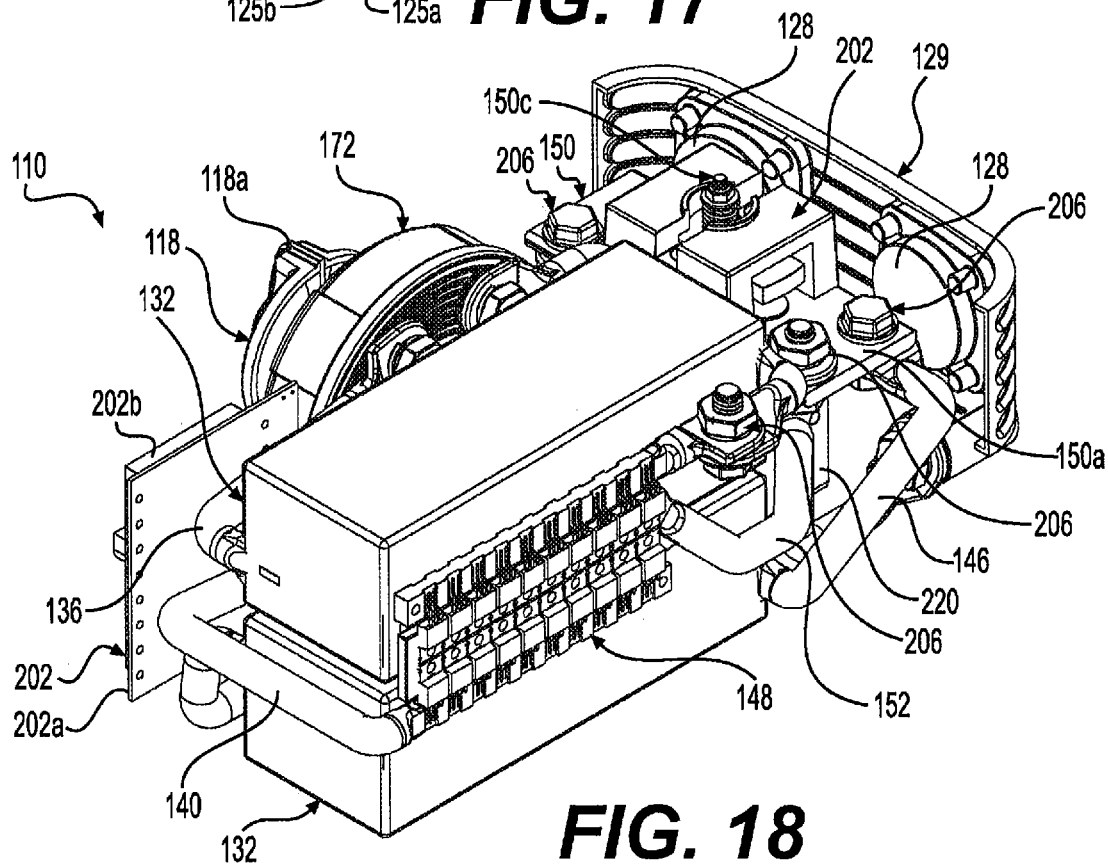
FIG. 18 is a rear and right side perspective view of the battery jump starting device shown in FIG. 1 with the cover removed.
Figure 19:
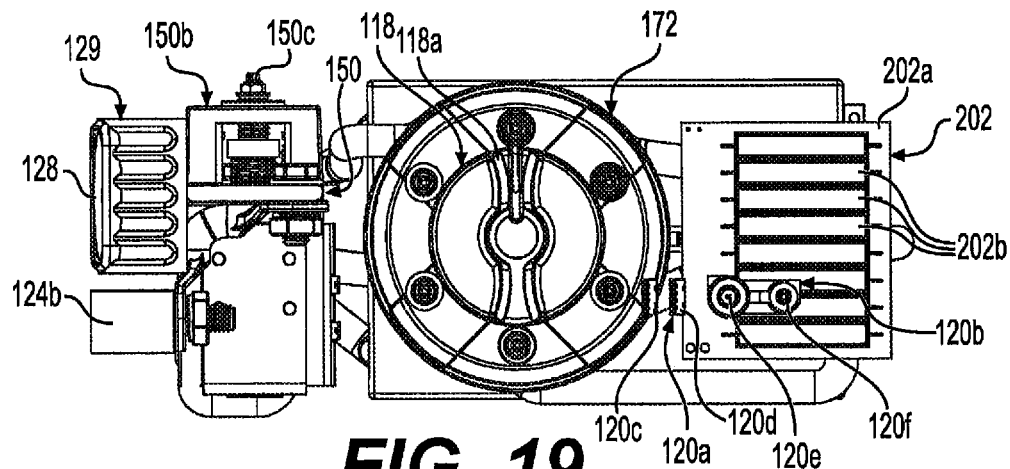
FIG. 19 is a front elevational view of the battery jump starting device shown in FIG. 1 with the cover removed.
Figure 20:
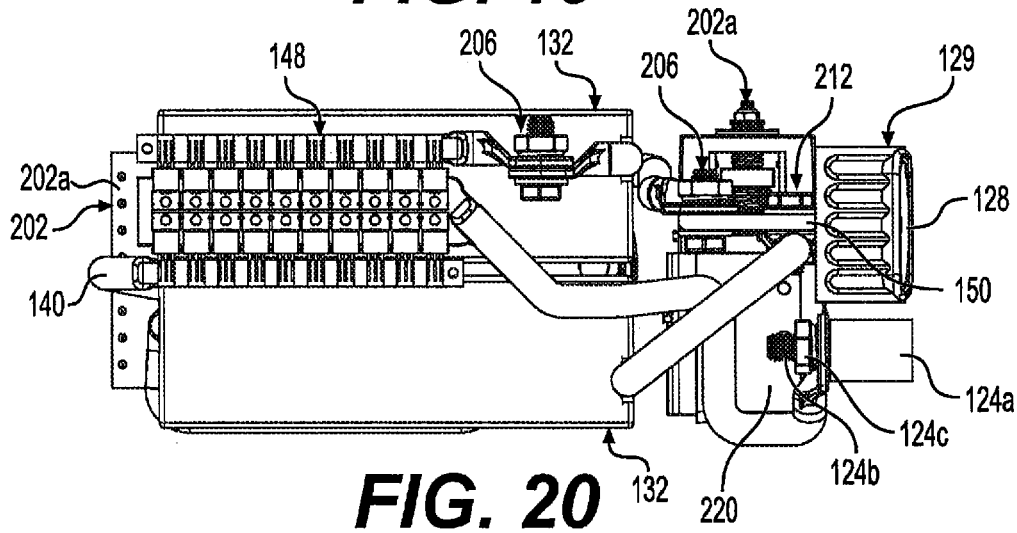
FIG. 20 is a rear elevational view of the battery jump starting device shown in FIG. 1 with the cover removed.
Figure 21:
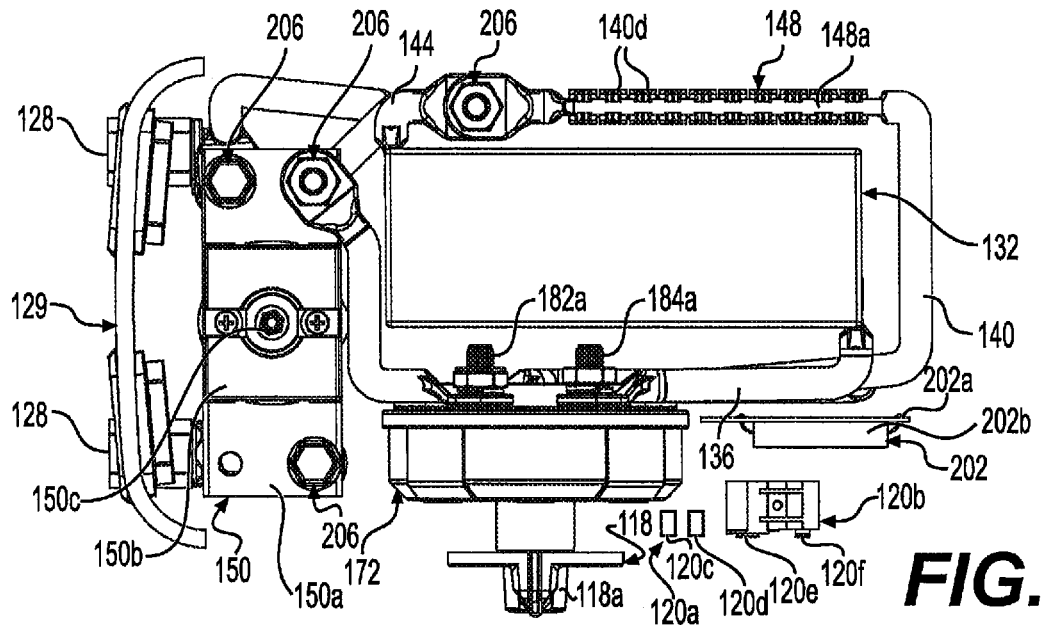
FIG. 21 is a top planar view of the battery jump starting device shown in FIG. 1 with the cover removed.
Figure 22:
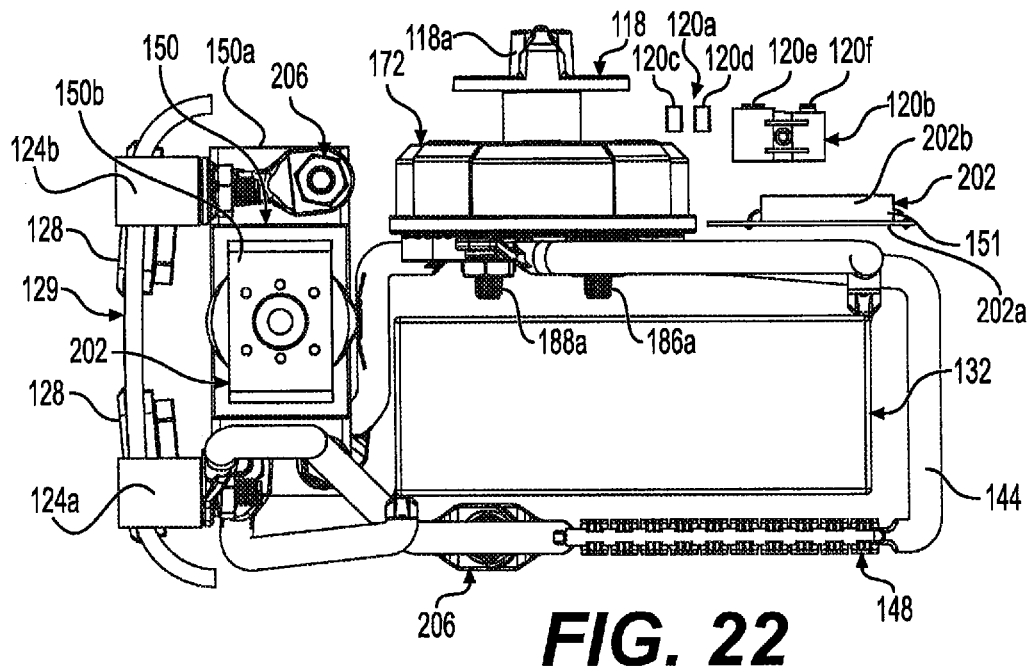
FIG. 22 is a bottom planar view of the battery jump starting device shown in FIG. 1 with the cover removed.
Figure 23:
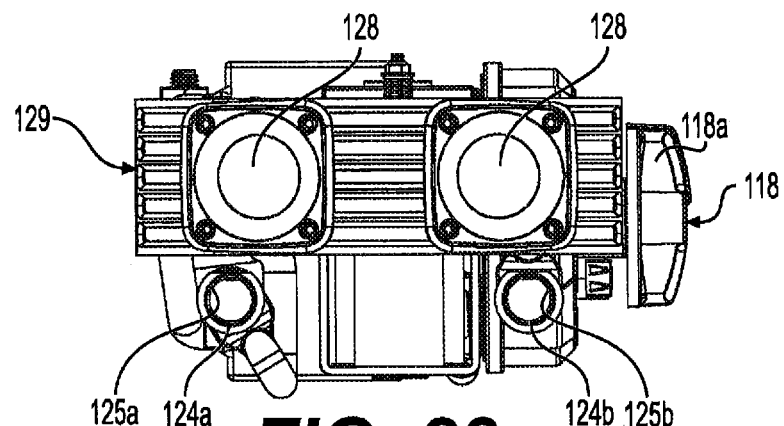
FIG. 23 is a left side elevational view of the battery jump starting device shown in FIG. 1 with the cover removed.
Figure 24:
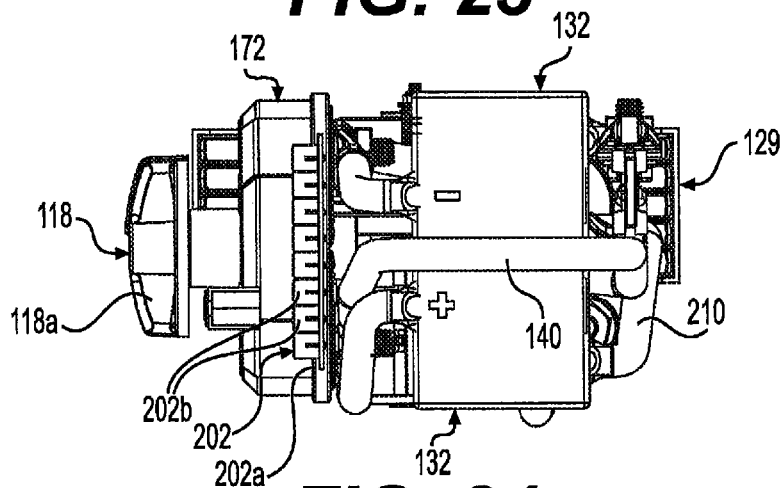
FIG. 24 is a right side elevational view of the battery jump starting device shown in FIG. 1 with the cover removed.
Figure 25:
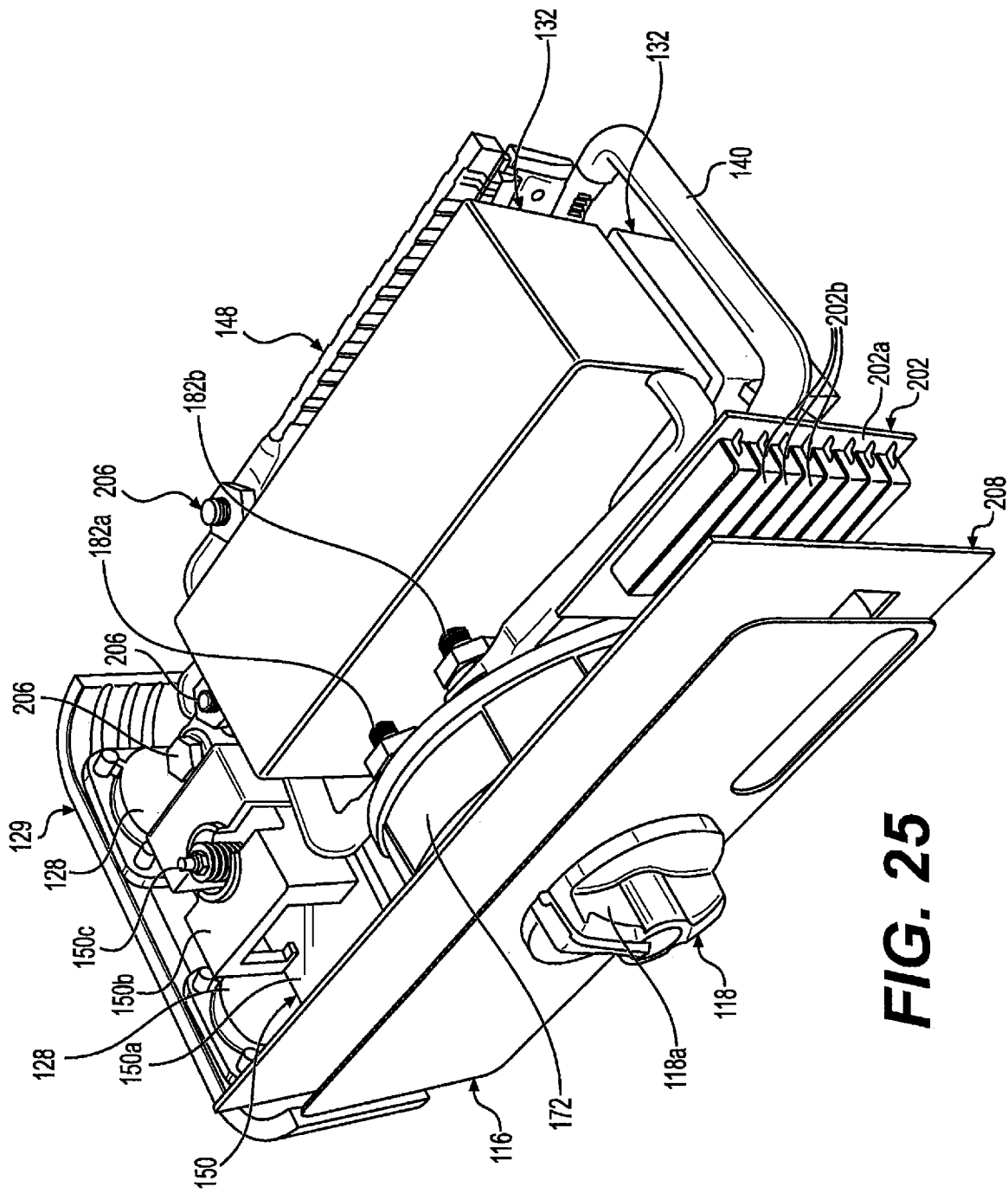
FIG. 25 is a front and top perspective view of the battery jump starting device shown in FIG. 1 with the cover removed.
Figure 26:
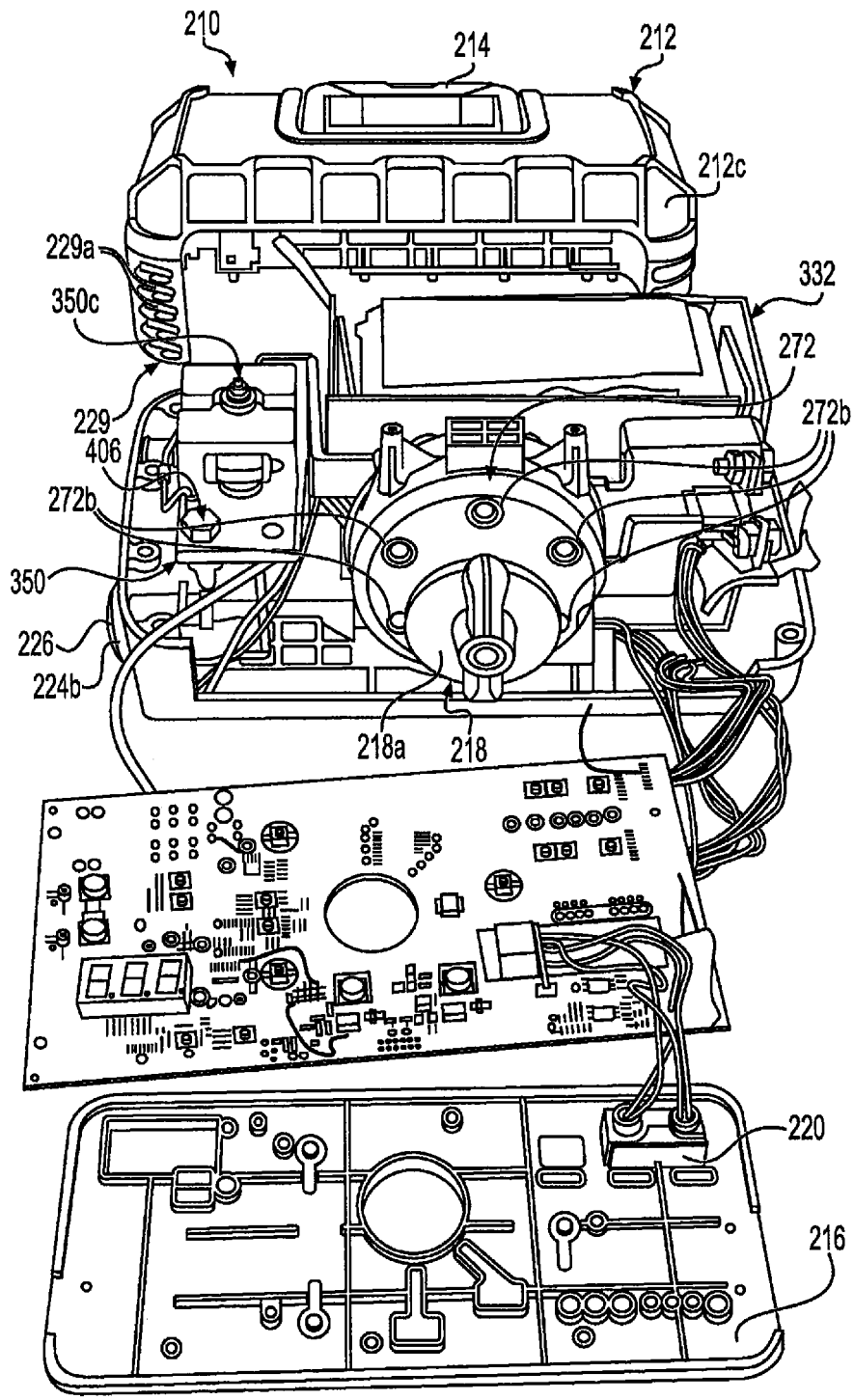
FIG. 26 is a front perspective view of the battery jump starting device shown in FIG. 1 with the cover removed.
Figure 27:
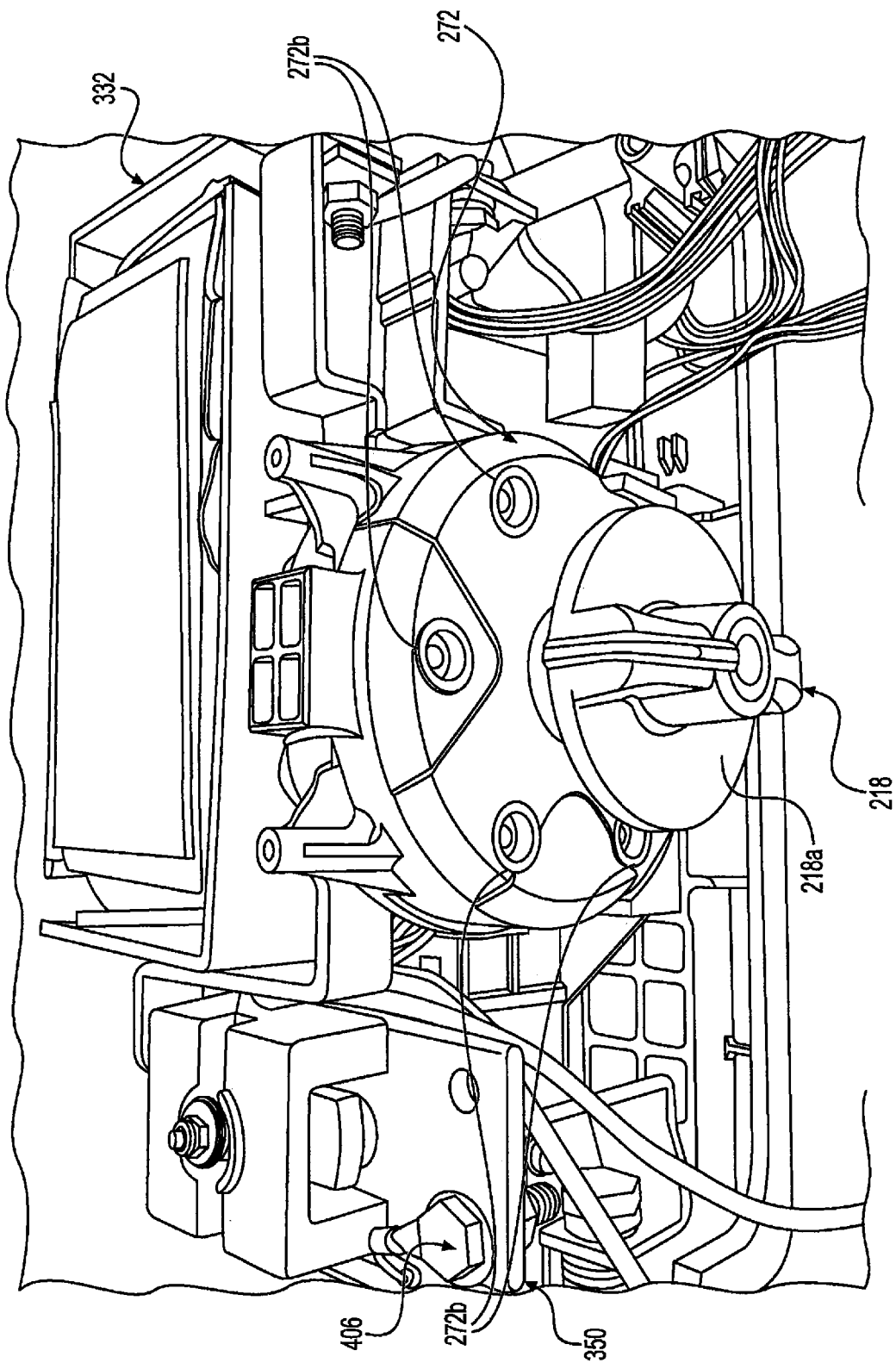
FIG. 27 is a front perspective view of the battery jump starting device shown in FIG. 1 with the cover removed.
Figure 28:
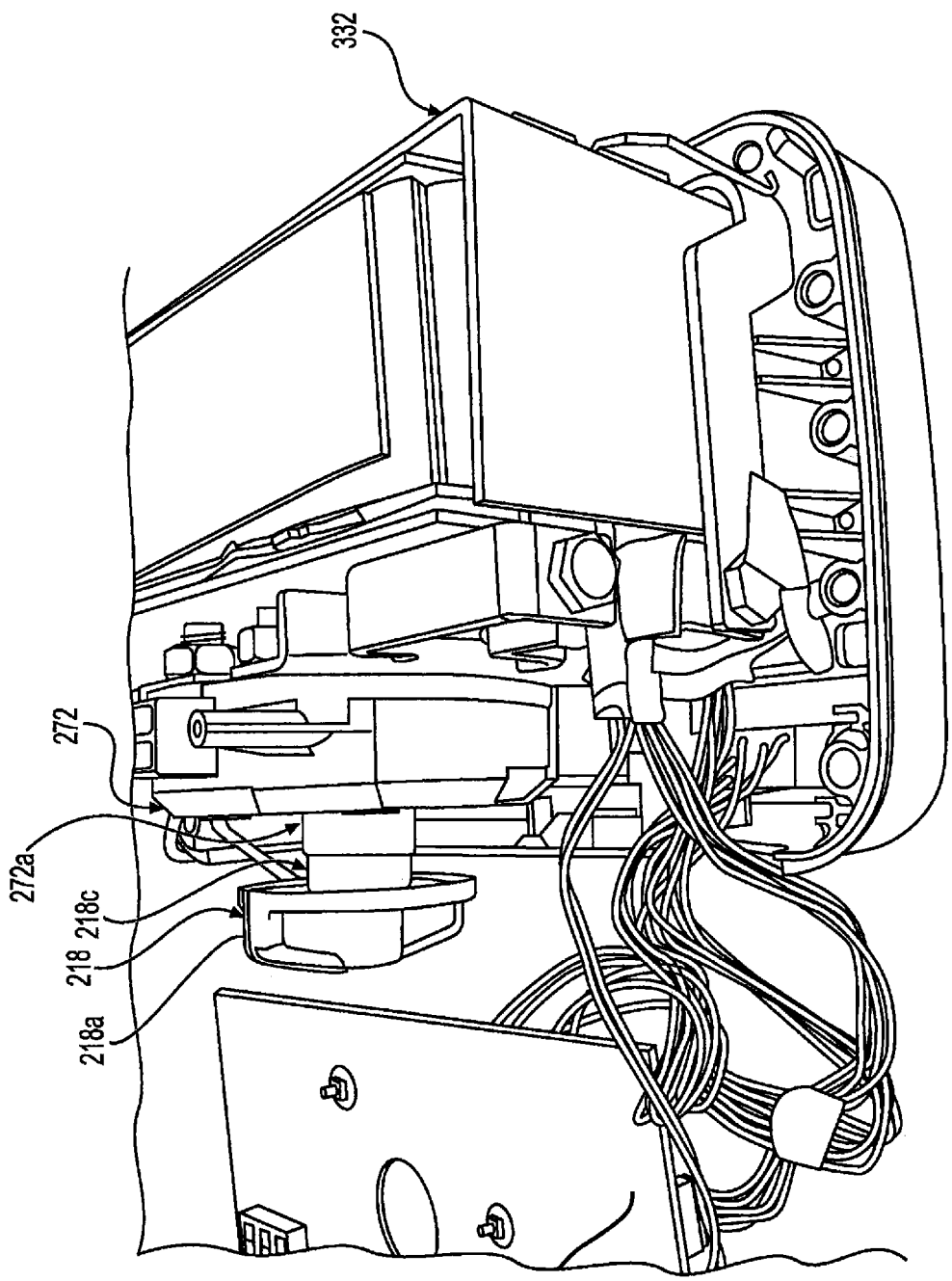
FIG. 28 is a right side perspective view of the battery jump starting device shown in FIG. 1 with the cover removed.
Figure 29:
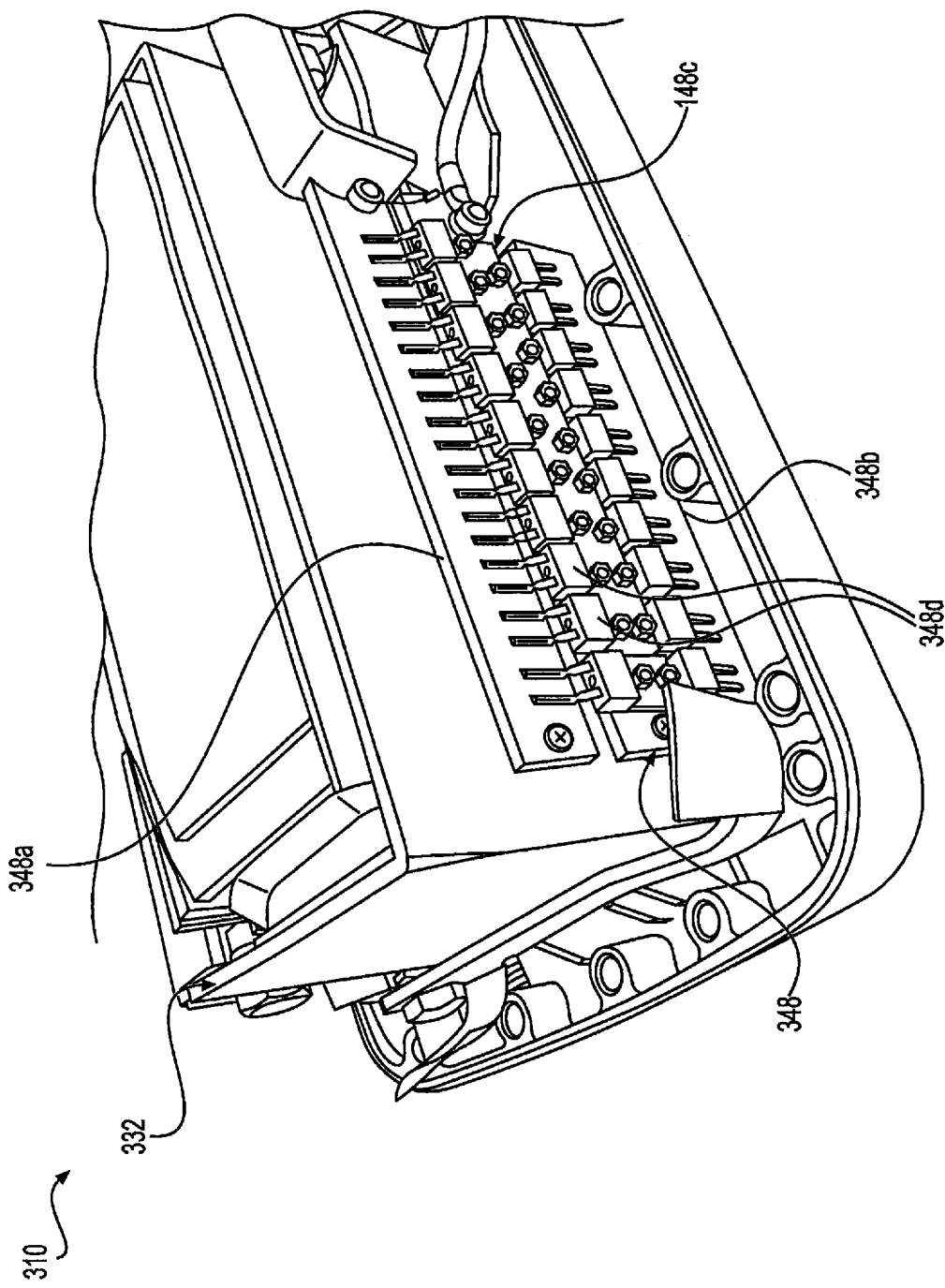
FIG. 29 is a right side and rear perspective view of the battery jump starting device shown in FIG. 1 with the cover removed.
Figure 30:
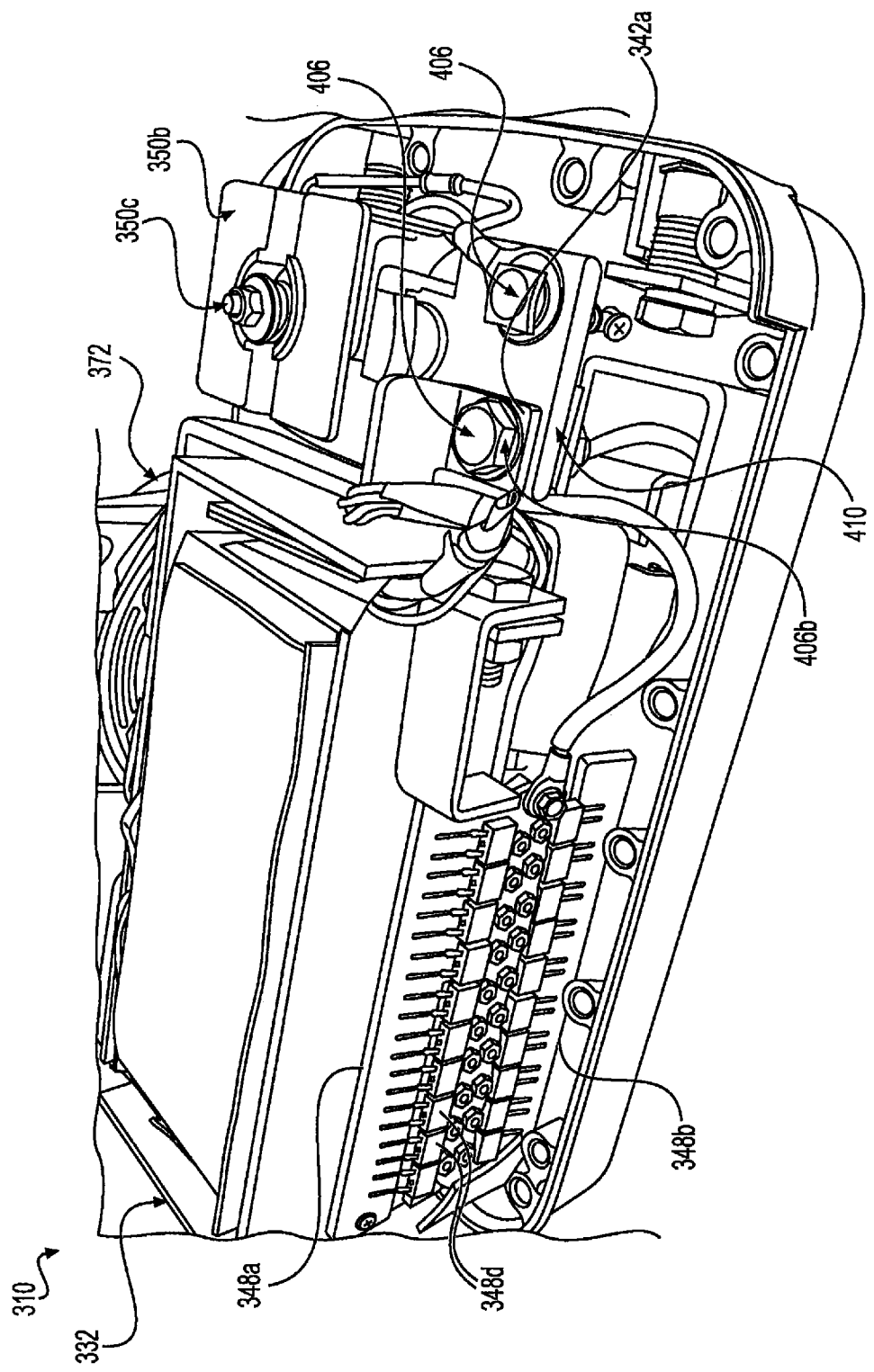
FIG. 30 is a rear perspective view of the battery jump starting device shown in FIG. 1 with the cover removed.
Figure 31:
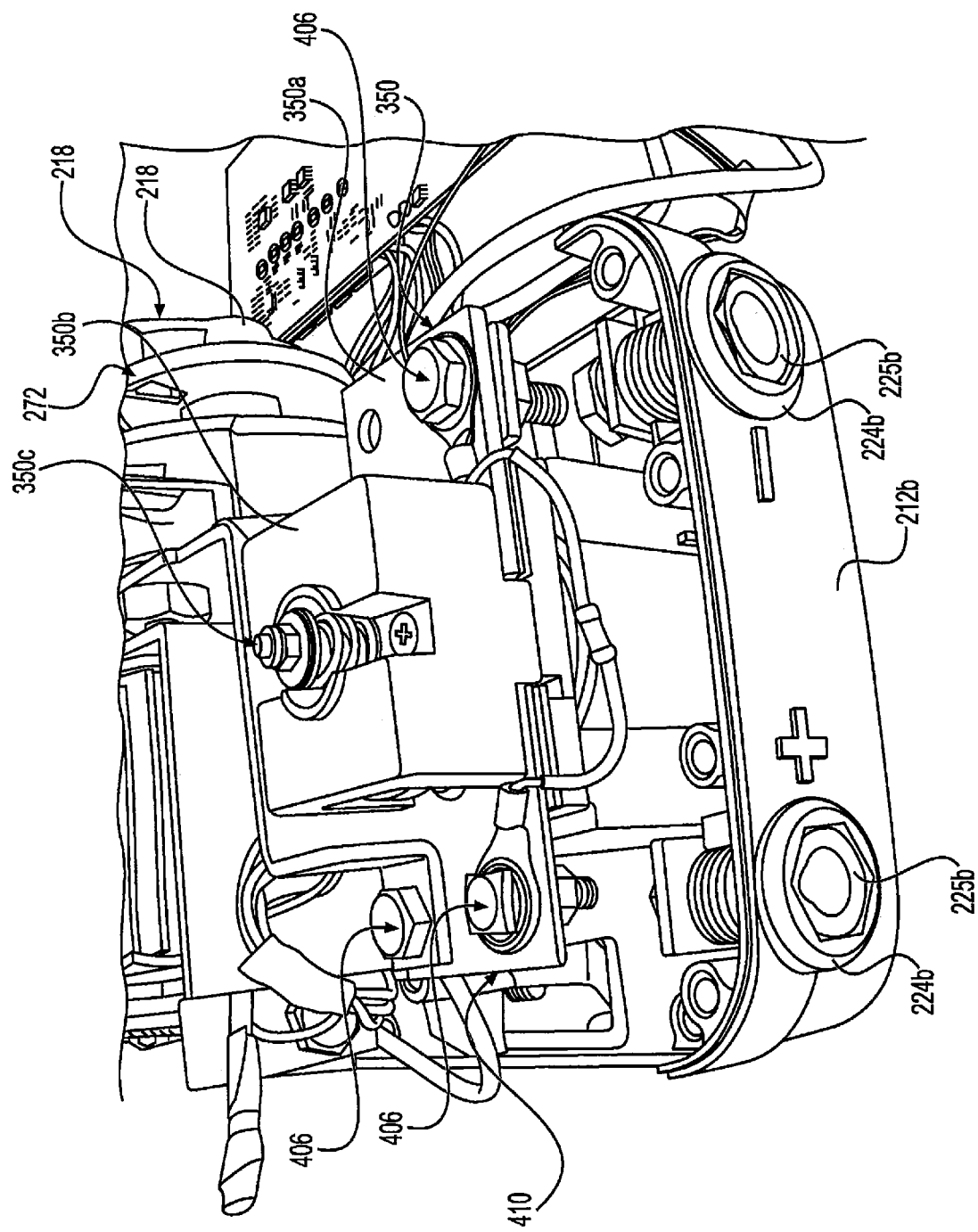
FIG. 31 is a left side perspective view of the battery jump starting device shown in FIG. 1 with the cover removed.

The battery jump starting device 110 further comprises a resistor array 202 (e.g. 12 V 5 A XGC) comprising a printed circuit board (PCB) 202a serving as a base supporting an array of individual resistors 202b, as shown in FIGS. 17 and 19. The PCB 202a also supports the dual 2.1 amp (A) USB OUT ports 120c, 120d, the 18 A 12V XGC OUT port 20e, and the 5 A 12V XGC IN port 20e.

The highly electrically conductive frame 170 can comprise the highly electrically conductive conductors or frame members 134, 136, 140, 142, 144, 146 and one or more electrical components (e.g. control switch, smart switch, plate 150a, reverse flow diode assembly 148) together forming and defining the of the high electrically conductive frame 170.

The highly electrically conductive frame member 170 can at least partially enclose or fully enclosed the batteries 132 in one or more planes of the battery (e.g. plane located perpendicular to x, y, z axes of the batteries 132). Further, the highly electrically conductive frame member 170 are located adjacent to and close to the outer surfaces of the batteries 132 to provide a compact configuration while preventing electrical shorts with electrical components of the rechargeable jump starting device 10.

Figure 16:
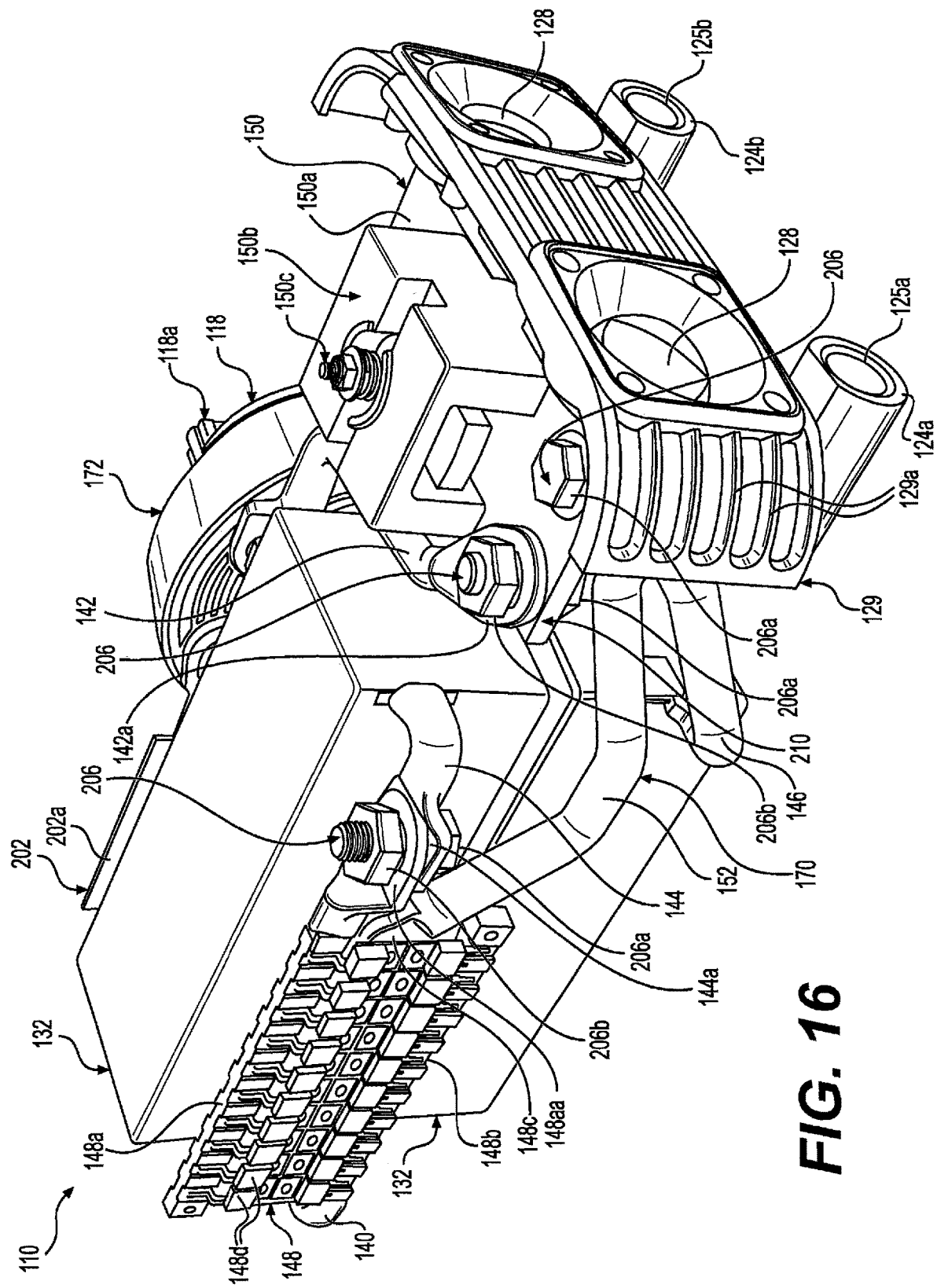
FIG. 16 is a rear and left side perspective view of the battery jump starting device shown in FIG. 1 with the cover removed.

The left side of the battery jump starting device 110 is also fitted with a pair of light emitting diodes 128 (LEDS) for using the battery jump starting device 110 as a work light. For example, the LEDs 128 are dual 1100 Lumen high-intensity LED floodlights), as shown in FIG. 16. The LEDs 128 are configured to have seven (7) operational modes, including 100% intensity, 50% intensity, 10% intensity, SOS (emergency protocol), Blink, Strobe, and Off.

The battery jump starting device 110 is fitted with a heat sink 129 (FIG. 16) for dissipating heat from the LEDs 128. For example, the heat sink 129 is made of a heat conductive material (e.g. molded or die cast metal plate). The heat sink 129 is provided with ribs 129a transferring heat to the surrounding atmosphere to prevent the LEDs 128 from overheating.

The battery jump starting device 110 is shown in FIG. 16 without any battery cables having battery clamps for connecting the battery jump starting device 110 to a battery of a vehicle to be jump started. The battery jump starting device can be configured to detachably connect to a set of battery cables having battery clamps (e.g. positive battery cable with a positive clamp, negative battery cable with a negative clamp). For example, see the detachable battery cables 56, 58 and battery clamps 60, 62 in FIG. 9, which can be detachably connected to the cam-locks 124a, 124b of the battery jump starting device 110. Alternatively, the battery jump starting device 110 can be fitted with battery cables having clamps hard wired to the device and non-detachable that same or similar to those shown in FIG. 10.

For example, the left side of the battery jump starting device 110 is provided with POSITIVE (+) cam-lock 124a and NEGATIVE (−) cam-lock 124b, as shown in FIG. 16. The cam-locks 124a, 124b include receptacles 125a, 125b configured for detachably connecting with connecting end 56a (FIG. 11) of the positive battery cable 56 and the connecting end 58a of negative battery cable 58, respectively. The cam-locks 124a, 124b can be fitted with sealing caps the same or similar to the sealing caps 26 (FIG. 1) for closing and sealing the receptacles 125a, 125b of the cam-locks 124a, 124b, respectively, during non-use of the battery jump starting device 110.

The battery jump starting device 110 comprises a main printed circuit board 208 serving as a base for LEDs for the control knob 18a and interface 16, and for supporting other electrical components of the battery jump starting device 110.

A third embodiment of the battery jump starting device 210 is shown in FIGS. 26-31. In this embodiment, the highly electrically conductive rigid frame is made from flat copper bar stock material having a rectangular-shaped cross-sectional profile. The flat copper bar is bent to at least partially wrap around and envelop the Li-ion batteries.

The invention claimed is:

1. A rechargeable jump starting device, comprising:
a rechargeable battery;
a positive cable having a positive clamp for connecting to a positive terminal of a vehicle battery;
a negative cable having a negative clamp for connecting to a negative terminal of the vehicle battery; and
an electrically conductive rigid frame for electrically connecting at least one of the positive cable or the negative cable to the rechargeable battery during a jump starting operation of the vehicle battery by the rechargeable jump starting device, wherein the electrically conductive rigid frame at least partially surrounds the rechargeable battery, the electrically conductive rigid frame comprising multiple electrically conductive rigid frame members each having connecting ends connected to each other or to other electrical components of the jump starting device,
wherein the rechargeable jump starting device is configured to connect the electrically conductive rigid frame in circuit with the rechargeable battery and at least one of the positive cable or the negative cable when jump starting the vehicle battery.

2. The device according to claim 1, wherein the rechargeable battery comprises a first rechargeable battery and a second rechargeable battery.

3. The device according to claim 1, wherein the rechargeable battery is at least one rechargeable Li-ion battery.

4. The device according to claim 1, wherein the electrically conductive rigid frame is configured to prevent movement or flexing and avoid electrical shorting with electrical components or parts of the rechargeable jump starting device.

5. The device according to claim 1, wherein the electrically conductive rigid frame encloses the rechargeable battery in at least one dimension of the rechargeable battery.

6. The device according to claim 1, wherein the electrically conductive rigid frame comprises a control switch rigidly connected to the electrically conductive rigid frame and configured to be selectively switched between a 12V mode and a 24 V mode of operation of the rechargeable jump starting device.

7. The device according to claim 1, wherein the at least one connector end of the multiple electrically conductive rigid frame members comprise a flattened connector end provided with a through hole for fastening together adjacent electrically conductive rigid frame members using a conductive nut and bolt.

8. The device according to claim 1, wherein the electrical components comprise one or more of a control switch, a smart switch, or reverse current diode array.

9. The device according to claim 1, wherein the rechargeable battery comprises a positive conductor and a negative conductor connected to the electrically conductive rigid frame.

10. The device according to claim 1, wherein the rechargeable battery is releaseably connected to the electrically conductive rigid frame.

11. The device according to claim 1, wherein the electrically conductive rigid frame includes a positive electrically conductive rigid frame for connecting the positive cable to the rechargeable battery.

12. The device according to claim 1, wherein the electrically conductive rigid frame includes a negative electrically conductive rigid frame for connecting the negative cable to the rechargeable battery.

13. The device according to claim 1, wherein the electrically conductive rigid frame includes a positive electrically conductive rigid frame for connecting the positive cable to the rechargeable battery and a negative electrically conductive rigid frame for connecting the negative cable to the rechargeable battery.

* * * * *